(12) United States Patent
Wang et al.

(10) Patent No.: US 7,519,754 B2
(45) Date of Patent: Apr. 14, 2009

(54) HARD DISK DRIVE CACHE MEMORY AND PLAYBACK DEVICE

(75) Inventors: Jeremy Wang, Shijr (TW); Fong-Long Lin, Fremont, CA (US); Bing Yeh, Los Altos Hills, CA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 140 days.

(21) Appl. No.: 11/637,419

(22) Filed: Dec. 11, 2006

(65) Prior Publication Data

US 2007/0233933 A1   Oct. 4, 2007

Related U.S. Application Data

(60) Provisional application No. 60/754,937, filed on Dec. 28, 2005.

(51) Int. Cl.
    *G06F 13/00*   (2006.01)
(52) U.S. Cl. ............. 710/110; 710/305; 710/308; 710/306; 710/311; 710/27; 365/63; 365/189.08; 712/33
(58) Field of Classification Search ........... 710/110, 710/205, 306, 308, 311, 27; 712/33; 365/63, 365/189.08
See application file for complete search history.

(56) References Cited

U.S. PATENT DOCUMENTS 4,534,011 A  *  8/1985  Andrews et al. ............... 710/58
4,837,677 A  *  6/1989  Burrus et al. ................ 710/308
4,860,192 A  *  8/1989  Sachs et al. .................... 711/3
4,937,567 A  *  6/1990  Orr et al. ...................... 370/463
4,955,024 A  *  9/1990  Pfeiffer et al. ............... 714/763

(Continued)

FOREIGN PATENT DOCUMENTS

WO   WO 2004/025474   3/2004

(Continued)

OTHER PUBLICATIONS

Lane Mason and Ivan Greenberg, Denali Memory Vendor Program—Microsoft Internet Explorer, Sponsored by Denali and Samsung Semiconductor, "Samsung OneNAND: Speeding The Next Generation Of Mobile Handset Innovation," pp. 1-28, dated Sep. 2, 2004.

(Continued)

*Primary Examiner*—Viet Q Nguyen
(74) *Attorney, Agent, or Firm*—DLA Piper LLP (US)

(57) ABSTRACT

A NOR emulating device using a controller and NAND memories can be used in a computer system in placed of the main memory or in place of the BIOS NOR memory. Thus, the emulating device can function as a bootable memory. In addition, the device can act as a cache to the hard disk drive. Further, with the addition of an MP3 player controller into the device, the device can function as a stand alone audio playback device, even while the PC is turned off or is in a hibernating mode. Finally with the MP3 player controller, the device can access additional audio data stored on the hard drive, again with the PC in an off mode or a hibernating mode. Finally, the device can function to operate the disk drive, even while the PC is off or is in a hibernating mode, and control USB ports attached thereto.

6 Claims, 8 Drawing Sheets

U.S. PATENT DOCUMENTS

| | | | | |
|---|---|---|---|---|
| 4,965,717 | A | * | 10/1990 | Cutts et al. ............... 714/12 |
| 4,974,153 | A | * | 11/1990 | Pimm et al. ............... 710/306 |
| 5,134,706 | A | * | 7/1992 | Cushing et al. ............ 710/268 |
| 5,189,665 | A | * | 2/1993 | Niehaus et al. ............ 370/248 |
| 5,210,530 | A | * | 5/1993 | Kammerer et al. ......... 340/3.51 |
| 5,218,686 | A | * | 6/1993 | Thayer ....................... 711/100 |
| 5,276,807 | A | * | 1/1994 | Kodama et al. ............ 710/305 |
| 5,276,823 | A | * | 1/1994 | Cutts et al. ................. 714/11 |
| 5,341,487 | A | * | 8/1994 | Derwin et al. ............. 711/146 |
| 5,379,415 | A | * | 1/1995 | Papenberg et al. ............ 714/5 |
| 5,404,485 | A | | 4/1995 | Ban |
| 5,446,869 | A | * | 8/1995 | Padgett et al. ............... 703/27 |
| 5,535,340 | A | * | 7/1996 | Bell et al. .................... 710/112 |
| 5,561,819 | A | * | 10/1996 | Gephardt et al. ............ 710/27 |
| 5,581,741 | A | * | 12/1996 | Clark et al. ................. 703/25 |
| 5,673,414 | A | * | 9/1997 | Amini et al. ................ 711/146 |
| 5,699,529 | A | * | 12/1997 | Powell et al. ............... 710/53 |
| 5,721,839 | A | * | 2/1998 | Callison et al. ............ 710/310 |
| 5,729,760 | A | * | 3/1998 | Poisner .......................... 710/3 |
| 5,764,966 | A | * | 6/1998 | Mote, Jr. ..................... 713/400 |
| 5,778,418 | A | | 7/1998 | Auclair |
| 5,805,792 | A | * | 9/1998 | Swoboda et al. ............. 714/28 |
| 5,805,835 | A | * | 9/1998 | Jeddeloh et al. ............ 710/107 |
| 5,905,509 | A | * | 5/1999 | Jones et al. ................. 345/520 |
| 5,937,425 | A | | 8/1999 | Ban |
| 5,955,905 | A | * | 9/1999 | Idei et al. .................... 327/160 |
| 5,990,914 | A | * | 11/1999 | Horan et al. ................ 345/531 |
| 6,016,530 | A | | 1/2000 | Auclair |
| 6,029,253 | A | * | 2/2000 | Houg ........................... 713/600 |
| 6,088,822 | A | * | 7/2000 | Warren ........................ 714/726 |
| 6,098,110 | A | * | 8/2000 | Witkowski et al. .......... 709/249 |
| 6,199,137 | B1 | * | 3/2001 | Aguilar et al. .............. 710/305 |
| 6,199,167 | B1 | * | 3/2001 | Heinrich et al. ............... 726/18 |
| 6,223,279 | B1 | * | 4/2001 | Nishimura et al. .......... 712/228 |
| 6,330,635 | B1 | | 12/2001 | Stafford |
| 6,415,353 | B1 | * | 7/2002 | Leung ......................... 711/106 |
| 6,421,765 | B1 | | 7/2002 | Poisner |
| 6,456,517 | B2 | | 9/2002 | Kim et al. |
| 6,502,146 | B1 | * | 12/2002 | Rasmussen et al. ......... 710/100 |
| 6,510,488 | B2 | | 1/2003 | Lasser |
| 6,633,944 | B1 | * | 10/2003 | Holm et al. ................. 710/306 |
| 6,636,935 | B1 | * | 10/2003 | Ware et al. ...................... 711/5 |
| 6,658,006 | B1 | * | 12/2003 | Chen et al. ............... 370/395.1 |
| 6,813,673 | B2 | * | 11/2004 | Kotlowski et al. ........... 710/305 |
| 6,871,253 | B2 | * | 3/2005 | Greeff et al. ................. 710/316 |
| 6,882,082 | B2 | * | 4/2005 | Greeff et al. ................. 310/307 |
| 6,934,785 | B2 | * | 8/2005 | Lee et al. ..................... 710/300 |
| 7,127,549 | B2 | | 10/2006 | Sinclair |
| 7,136,973 | B2 | | 11/2006 | Sinclair |
| 7,334,107 | B2 | * | 2/2008 | Schoinas et al. ............. 711/207 |

| | | | |
|---|---|---|---|
| 2002/0185337 | A1 | 12/2002 | Miura et al. |
| 2003/0050087 | A1 | 3/2003 | Kwon |
| 2003/0156454 | A1 | 8/2003 | Wei et al. |
| 2003/0206442 | A1 | 11/2003 | Tang et al. |
| 2004/0049629 | A1 | 3/2004 | Miura et al. |
| 2004/0064606 | A1 | 4/2004 | Kimura |
| 2004/0139310 | A1 | 7/2004 | Maeda et al. |
| 2005/0204091 | A1 | 9/2005 | Kilbuck et al. |
| 2006/0041711 | A1 | 2/2006 | Miura et al. |
| 2006/0053246 | A1 | 3/2006 | Lee |

FOREIGN PATENT DOCUMENTS

| | | |
|---|---|---|
| WO | WO2004/049168 | 6/2004 |
| WO | WO2005/076137 | 8/2005 |

OTHER PUBLICATIONS

Anu Murthy and Brian Gardner, Denali Memory Vendor Program—Microsoft Internet Explorer, Sponsored by Denali and Samsung Semiconductor, "Ultra-Fast Controller For An Ultra-Fast Flash Device—Extracting All of One-NAND Performance," pp. 1-51, Aug. 17, 2005.

Don Barnetson, Samsung Semiconductor, Inc., "OneNAND Bridge or Destination," pp. 1-8, Sep. 22, 2005.

M-Systems, Flash Disk Pioneers, "DiskOnChip G3 Low Power (LP) 64MB (512Mb)—Flash Disk With 1.8V Core and I/O," pp. 1-62, 91-DT-0904-20, dated Sep. 2004; and "Big/Little Endian Byte Order," pp. 6-20, AP-DOC-0504, Rev. 1.0.

M-Systems, Flash Disk Pioneers, "DiskOnChip H1 4Gb (512MBYTE) and 8Gb (1GByte) High Capacity Flash Disk With NAND and x2 Technology," pp. 1-66, 95-DT-1104-01, dated 2005.

M-Systems DiskOnChip, "On-Board Embedded Flash Drive," Binder with several articles, datasheets and other documents, 2006.

Korean Intellectual Property Office Notice of Preliminary Rejection dated Feb. 29, 2008 corresponding to the related Korean Patent Application No. 2006-0136569.

PRC's First Office Action (English Version) dated Apr. 11, 2008 including the cited Chinese references (Chinese Version) corresponding to the related Chinese Patent Application No. 200610064390.4.

PCT International Preliminary Examination Report (English Version), published International Patent Application No. WO 2004/049168 A1 (Japanese Version), PCT Search Report (Japanese Version) in connection with PCT Patent Application No. JP2003/015165.

PCT International Preliminary Examination Report, published International Patent Application No. WO 2005/076137 A1, PCT Written Opinion and Search Report in connection with PCT Patent Application No. CA2005/000137.

European Search Report dated Oct. 18, 2007 corresponding to the related European Patent Application No. 06026552.7-2212.

* cited by examiner

HARD DISK DRIVE CACHE MEMORY AND PLAYBACK DEVICE

This application claims the priority of a provisional application 60/754,937 filed on Dec. 28, 2005, whose disclosure is incorporated herein in its entirety.

TECHNICAL FIELD

The present invention relates to a memory device and more particularly to a memory device for use as a disk drive cache memory in a personal computer, such as a PC, and can also function as a playback device for play back of music or video while the PC is either in a hibernating mode or even off mode.

BACKGROUND OF THE INVENTION

Volatile random access memory, such as SRAM or DRAM (or SDRAM) or PSRAM (hereinafter collectively referred to as RAM), are well known in the art. Typically, these types of volatile memories receive address signals on an address bus, data signals on a data bus, and control signals on a control bus.

Parallel NOR type non-volatile memories are also well known in the art. Typically, they receive address signals on the same type of address bus as provided to a RAM, data signals on the same type of data bus as that provide to a RAM, and control signals on the same type of control bus as that provided to a RAM. Similar to a RAM, NOR memories are a random access memory device. However, because NOR memories require certain operations, not needed by a RAM, such as SECTOR ERASE or BLOCK ERASE, the operations, which are in the nature of commands, are provided to the NOR device as a sequence of certain data patterns. This is known as NOR command protocols. In the prior art, there are two types of NOR command protocols: 1) those protocol commands that are compatible with the protocol command set initially promulgated by Intel, and 2) those protocol commands that are compatible with the protocol command set initially promulgated by AMD. In either event, a NOR memory interfaces electrically to the same address, data and control buses as a RAM interfaces with. Furthermore, conventional NOR memory devices may also provide data, address, and control signals serially, in well known conventional formats such as SPI, LPC or firmware hub.

NAND type non-volatile memories are also well known in the art. Unlike parallel NOR devices, however, NAND memories store data in random accessible blocks in which cells within a block are stored in a sequential format. Further, address and data signals are provided on the same bus, but in a multiplexed fashion. NAND memories have the advantage that they are more dense than NOR devices, thereby lowering the cost of storage for each bit of data.

Because of the lower cost per bit of data for a NAND device, there has been attempts to use a NAND device to emulate the operation of a NOR device. One such device called OneNAND (trademark of Samsung Corporation) uses a RAM memory to temporarily buffer the data to and from a NAND memory, thereby emulating the operation of a NOR memory. However, it is believed the OneNAND device suffers from two shortcomings. First, it is believed that the user or the host device which interfaces the OneNAND must keep track of the data coherency. In data coherency, because the user or host writes to the RAM, the data in the RAM may be newer (and therefore different from the) data in the location in the NAND from which the data in the RAM was initially read. Thus, in the OneNAND device the user or the host must act to write data from the RAM back to the ultimate location in the NAND to store that data, or to remember that the data in the RAM is the newer data. A second problem is believed to be a shortcoming of the OneNAND device is that it cannot provide for automatic address mapping. In the OneNAND device, once data is written into the RAM portion of the OneNAND device, the host or the user must issue a command or series of commands to write the data in the RAM portion to the ultimate location in the NAND portion of the OneNAND device. Similarly, for a read operation, the host or user must issue a read command from specified location(s) in the NAND portion of the OneNAND to load that data into the RAM portion, and then read out the data from the RAM portion.

Another prior art device that is believed to have similar deficiency is the DiskOnChip device from M Systems. In the DiskOnChip device, a thin controller with a limited amount of RAM controls the operation of NAND memories. However, it is believed that the controller portion of the DiskOnChip device does not have any on board nonvolatile bootable memory, such as NOR memory.

A prior art publication showing the use of NAND memories with a controller emulating NOR memory operation is shown in US patent application 2006/0053246, published Mar. 9, 2006. Although this publication shows the use of NAND memories with controller connected to a plurality of processors, it appears that the NAND memory cannot be accessed directly through an ATA format operation. Thus, all access to the NAND memory must be accomplished by the controller with no direct access from the external.

Computer systems are well known in the art. In particular, a computer system adhering to the "IBM PC" standard is well known in the art. Referring to FIG. 6, there is shown a computer system 300 of the prior art. The computer system 300 conforms to the "IBM PC" architecture. The system 300 comprises typically a motherboard 312 on which are mounted a variety of components such as a processor 314, such as a Pentium microprocessor made by Intel Corporation, a memory controller hub chip 316, also known as Northbridge chip 316 and a IO controller hub chip 318, also known as Southbridge chip 318. The Northbridge 316 and the Southbridge 318 are known as chipsets and can be obtained from Intel Corporation. Finally, the motherboard 312 comprises a BIOS 320 which is typically a NOR type non-volatile memory device, which is connected to the Southbridge 318 via a bus 350. The bus 350 is also connected to other components of the system 300, such as Hard Disk Drive (HDD) 326, Modem 328, USB or other ports 327, speaker 325, Keyboard 322 and mouse 324. The foregoing system is described and is disclosed in U.S. Pat. No. 6,421,765. See also U.S. Pat. No. 6,330,635.

In the operation of the computer system 300, the processor 314, boots up from the code that is initially stored in the BIOS 320. Once the processor 314 has executed the initial code from the BIOS 320, it sends signals to the HDD 326 to retrieve further code/data stored on the HDD 326. Thereafter, the operation continues.

As can be seen from the foregoing, if the drive 326 is activated, the processor 314 and the entire system 300 must be "on." With battery time on a lap top computer 300 at a premium, it is desired to conserve battery power. Further, it is desired to improve the performance of such a system 300. Accordingly, there is a need for an improved device that can satisfy the foregoing.

SUMMARY OF THE INVENTION

In the present invention, a novel memory device is disclosed. The novel memory device uses NAND flash memories to emulate the function of a NOR memory. Further, the memory device is used in a PC system to replace the volatile DRAM or to be used as a bootable BIOS memory. In addition, the memory device can act as a cache to the hard disk drive. Further, the memory device can act as a hub for USB devices thereby controlling the transfer of data to/from the hard disk drive, even while power is off to the main processor. Further, since the memory device has a controller, the controller can perform other functions (or a dedicated processor, such as DSP, can also be used) such as MP3 playback. Thus, the memory device can function as a stand alone audio playback device, even while the PC is turned off or is in a hibernating mode. Finally with the MP3 player controller, the memory device can access additional audio data stored on the hard drive, again with the PC in an off mode or a hibernating mode.

DETAILED DESCRIPTION OF THE INVENTION

Figure 1:
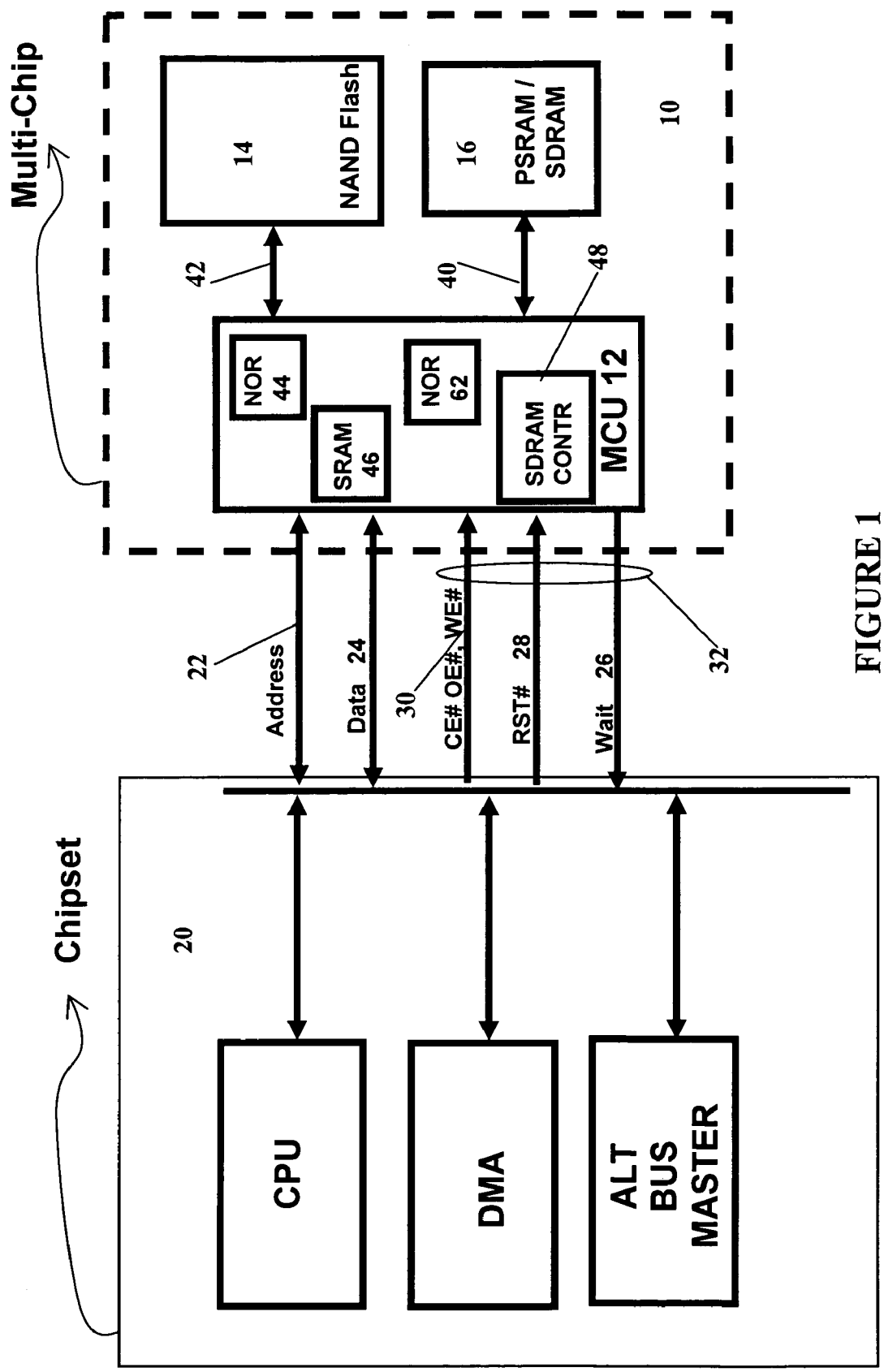
FIG. 1 is a block level diagram of a first embodiment of a memory device, including the memory controller, connected to a host system or user.

Referring to FIG. 1, there is shown a first embodiment of a memory device 10. The memory device 10 comprises a memory controller 12, a NAND memory 14, and a RAM memory 16. The memory device 10 interfaces with a host device 20, through a first RAM address bus 22, a first RAM data bus 24, and a plurality of control signals such as wait 26, RST# 28, and CE#, OE#, and WE# 30, all of which are well known to one skilled in the art of control signals for a RAM bus. Hereinafter unless otherwise specified, all of the control signals on the wait 26, RST# 28 and CE#, OE# and WE# 30 are referred to as first RAM control bus 32. The first RAM address bus 22, the first RAM data bus 24 and the first RAM control bus 32 are connected from the host device 20 to the memory controller 12 of the memory device 10. Further, as discussed previously, the interface between the memory device 10 and the host device 20 can be via a serial bus in which the data, address and control buses are serially connected between the host device 20 and the memory device 10. Such a memory device 10 is also within the scope of the present invention.

The memory controller 12 has a second RAM address bus (similar to the first RAM address bus 22), a second RAM data bus (similar to the first RAM data bus 24), and a second control bus (similar to the first RAM control bus 32) all of which are collectively shown as simply as a second RAM bus 40, connected to the RAM memory 16. The memory controller 12 further has a NAND address/data bus and a NAND control bus (all of which are collectively shown as a NAND bus 42) connected to a NAND memory 14. The RAM memory 16 can be integrated or embedded in the memory controller 12, as a single chip integrated circuit. Alternatively, the RAM memory 16 can be an integrated circuit separate from the memory controller 12. Alternatively, portions of the RAM memory 16 can be integrated with the memory controller 12 and portions of the RAM memory 16 can be separated from the memory controller 12. The advantage of the RAM memory 16 being a separate die will be discussed hereinafter. However, the advantage of the RAM memory 16 being integrated with the memory controller 12 is that the RAM memory 16 may be faster in operation.

Figure 3:
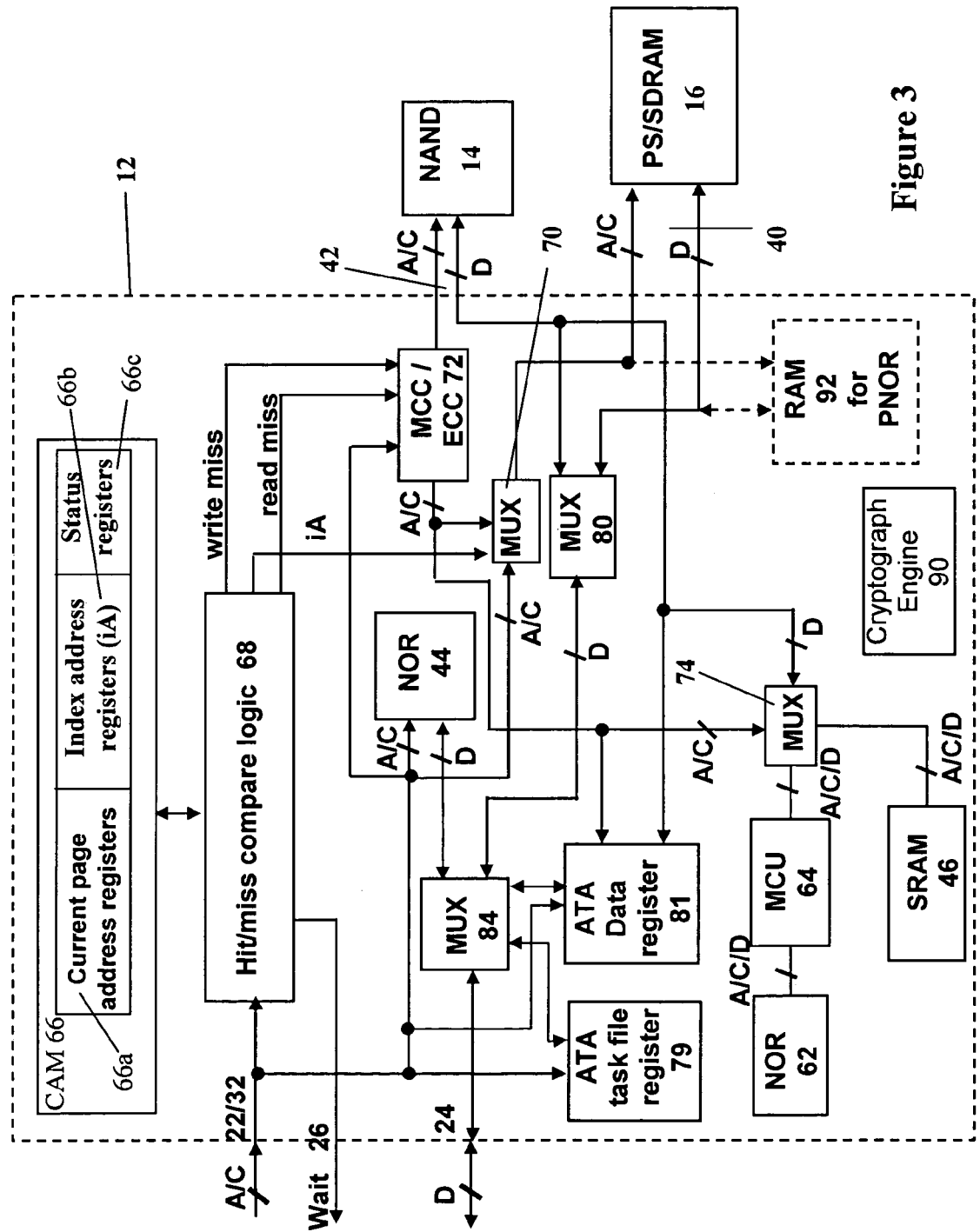
FIG. 3 is a detailed block level circuit diagram of the controller, used in the memory device of FIG. 1.

In one embodiment, the memory controller 12 is a single integrated circuit die. The controller has also a first NOR memory 44, a second NOR memory 62, a SRAM memory 46, and SDRAM controller 48 (for controlling the operation of the RAM 16, if the RAM 16 is an SDRAM type of RAM memory, and is external to the memory controller 12) embedded within the memory controller integrated circuit die. Of course, the first NOR memory 44 and the second NOR memory 62 may be a part of the same physical NOR memory. A detailed block level diagram of an embodiment of the memory controller 12 is shown in FIG. 3. As used herein a "NOR memory" means any type of randomly accessed non-volatile memory. The NOR memory includes but is not limited to floating gate type memory, ROM, or cells using trapping material etc. Further as used herein "NAND memory" means any type of serially accessed non-volatile memory that may contain defective cells.

In one embodiment, each of the memory controller 12, the RAM memory 16 and the NAND memory 14 is made of a single integrated circuit die and are packaged together in a MCP (Multi-Chip Package). The advantage of such an arrangement is that for a user or host 20 that requires a large (or small) amount of memory, the amount of memory can be changed by simply changing the readily available die for the NAND memory 14 or if speed is a factor then changing the readily available RAM memory 16. Thus, having the memory controller 12, the RAM memory 16 and the NAND memory 14 in separate dies means that-different sizes of the memory device 10 and speed or performance can easily manufactured.

Of course, the memory controller 12, the RAM memory 16 and the NAND memory 14 can also be made into a single integrated circuit die. If the memory controller 12, the RAM memory 16 and the NAND memory 14 are made of a single integrated circuit die, then provision can also be made to provide an external NAND bus 42 so that additional externally provided NAND memories can be attached to the memory device 10 to expand the memory capacity of the memory device 10.

Figure 2:
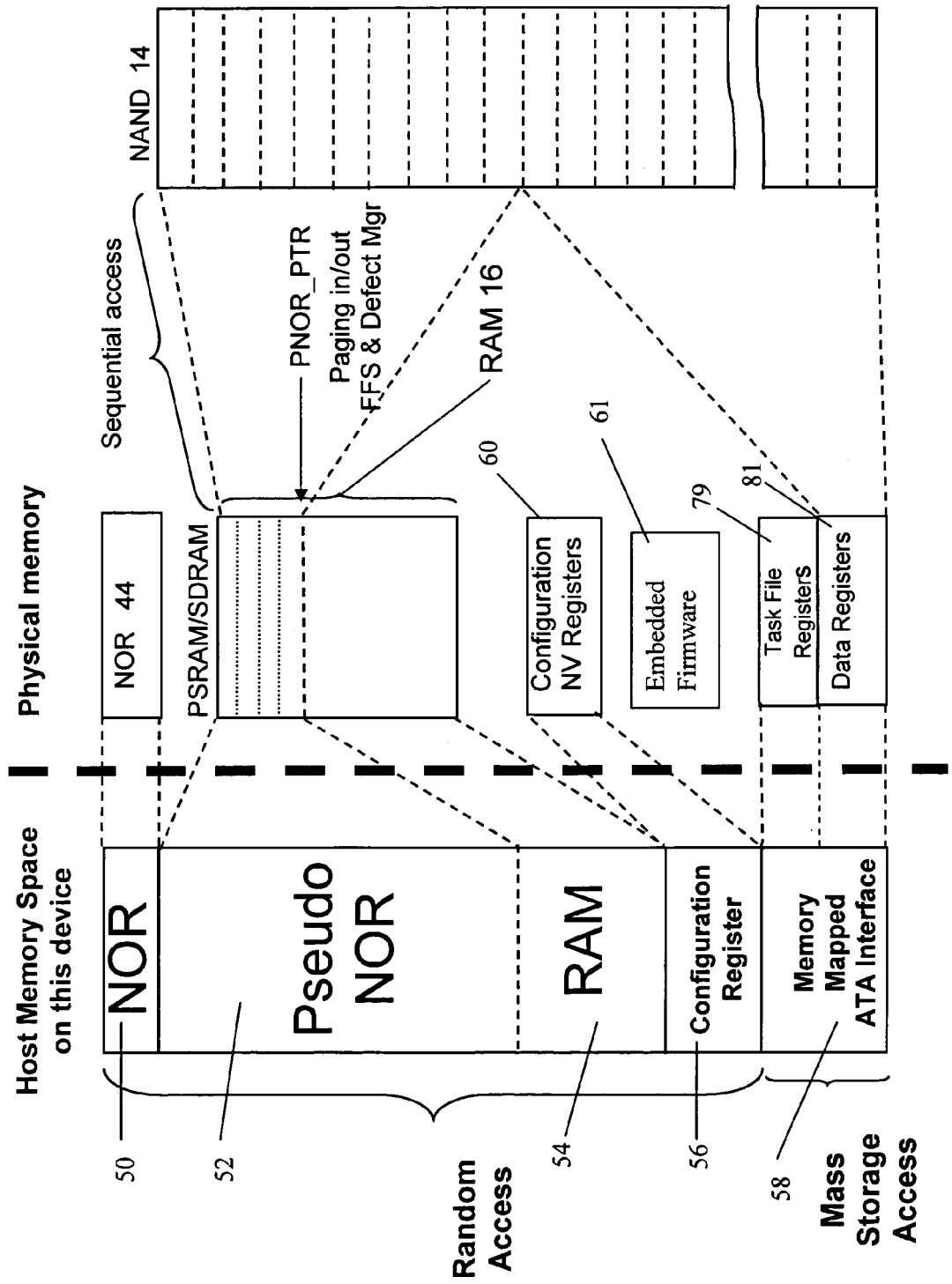
FIG. 2 is a memory mapping diagram showing the mapping of the address space as seen-by the host or the user, external to the memory device of FIG. 1, to the NOR memory, the RAM memory and the NAND memory in the first embodiment of the memory device shown in FIG. 1.

Referring to FIG. 2 there is shown a memory map showing the mapping of addresses as seen by the host device 20 and as mapped to in the first embodiment of the memory device 10 shown in FIG. 1. The memory map as seen by the host device 20 has two general sections: Random Access and Mass Storage Access. The Random Access section occupies the lower memory address location (although that is not a requirement). Within the Random Access section, the lowest memory address is that for NOR memory access portion 50, followed by a Pseudo NOR (PNOR) memory access portion 52, followed by a RAM access portion 54, followed by a configuration access portion 56. Each of the portions will be explained as follows.

The NOR memory access portion 50 as seen by the host device 20 is that when the host 20 operates in this portion 50, the result is an operation on the physical NOR memory 44. Thus, the mapping of the memory portion 50 to the physical NOR memory 44 is a one-to-one. In other words, the amount of memory space allocated to the NOR portion 50 depends upon the amount of NOR memory 44 that is available in the memory device 10. In one embodiment, the amount of NOR memory 44 embedded in the memory controller 12 is 4 Megabits, with 2K Word sector size and with 32K Word Block size. Further, when the host device 20 believes it is operating on the NOR portion 50 (as in issuing commands of read/write/erase etc.), the resultant operation is directly on the NOR memory 44. This NOR portion 50 can be used by a host device 20 seeking to store performance critical code/data that requires random access with no latency. Further, if a program is stored in the NOR memory 44, it can be executed in place within the NOR memory 44. Thus the NOR memory 44 can store program or code that "boots" the host device 20.

The PNOR portion 52 as seen by the host device 20 is that when the host 20 operates in this portion 52, the host 20 believes it is operating on RAM memory 16 which is non-volatile. Therefore, to the host device 20, it can operate on the PNOR portion 52 like any other RAM memory 16 except the data stored in the PNOR portion 52 is non-volatile, all without issuing NOR protocol commands. In one embodiment, the PNOR portion 52 is divided into pages, just like a NAND memory, with each page either 8K Byte, 2K Byte, or 512 Byte. In operation, when the host device 20 interfaces with the memory device 10, it interfaces with the RAM memory 16, with the memory controller 12 "backing up" the data to and from the NAND memory 14, and maintaining data coherence between the RAM memory 16 and the NAND memory 14, and with the memory controller 12 mapping the address supplied by the host device 20 to the address of the actual data in the NAND memory 14. Because there is a larger amount of NAND memory 14 available than actual RAM memory 16, the PNOR portion 52 can be much larger memory space than the actual amount of memory available in the RAM memory 16.

Further, the PNOR portion 52 can be divided into four (4) regions, each mapped to a zone: zone 0, zone 1, zone 2 and zone 3 in the RAM memory 16. Each zone can have a different degree of mapping. Where the mapping from a region in the PNOR portion 52 to a zone in the RAM memory 16 is one-to-one, then this is called "static paging mode." Where the mapping from a region in the PNOR portion 52 to a zone in the RAM memory 16 is many-to-one, then this is called "dynamic paging mode." A static paging mode mapping will result in the lowest latency in that the amount of memory space in the PNOR portion 52, e.g. 256 pages (or 512K bytes in the case of 2K byte pages) is always mapped to the same amount of memory space in the RAM 16, e.g. 256 pages (or 512K bytes), which is in turn mapped into 256 pages (or 512K bytes) in the NAND memory 14. In that event, although there is no latency in access during operation because the RAM memory 16 is also random access, there is latency in initial load and storage from and to the NAND memory 14 to and from the RAM memory 16. In a dynamic paging mode mapping, such as mapping 40,000 pages of the memory space in the PNOR portion 52 mapped to 512 pages of RAM memory 16, which in turn is mapped to 40,000 pages of NAND memory 14, a larger amount of latency will occur. This latency will occur both in the initial loading of the data/program from the NAND memory 14 into the RAM 16, as well as during operation of retrieving data/program from the PNOR portion 52, which may require data/program to be first loaded into the RAM 16 from the NAND memory 14, if there is a cache miss. Thus, the latency for the PNOR portion 52 will differ depending upon the size of the zones configured. The boundary of each zone of the RAM memory 16, and therefore, how much memory space is mapped from each region of the PNOR portion 52 into the RAM memory 16 can be set by the host device 20 or the user. As a result the host device 20 can configure the four zones to operate either in a static paging mode to store/retrieve program or time critical data, or to operate in a dynamic paging mode to store/retrieve program or data that is not time critical, with result that there is a latency if there is a cache miss.

In the event a zone is configured for static paging mode, data read coherence is not an issue, since the same amount of memory space in the PNOR portion 52 is always mapped to the same amount of space in the RAM memory 16. However, data write coherence must still be performed. However, in the event a zone is configured for dynamic paging mode, data coherence must be provided. The host device 20 can configure the zone to operate in one of two cache coherence modes. In a first mode, the host device 20 initiates the cache coherence mode. In this mode, the host device 20 flushes the cache operation in the RAM memory 16 as and when needed by the host device 20. In a second mode, the memory controller 12 initiates the cache coherence mode, by flushing the cache operation in the RAM memory 16 as and when needed by the memory controller 12 to maintain the coherence of the data between the cache in the RAM memory 16 and the NAND memory 14.

Once the amount of memory space for the PNOR portion 52 and their mapping to the RAM memory 16 is set by the user, the remainder of the available memory space in the RAM memory 16 is available to be used for RAM memory access portion. The RAM memory access portion 54 as seen by the host device 20 is that when the host 20 operates in this portion 54, the result is an operation on the physical RAM memory 16. Thus, the mapping of the memory portion 54 to the physical RAM memory 16 is a one-to-one. Further, the amount of memory space allocated to the RAM portion 54 depends upon the total amount of RAM memory 16 that is available in the memory device 10, and the degree of mapping of the memory space portion of the PNOR memory 52 to the RAM memory 16. When the host believes it is operating on the RAM portion 54 (as in issuing commands of read/write etc.), the resultant operation is directly on the RAM memory 16. This RAM portion 54 can be used by a host device 20 seeking to use the memory space as a buffer area. Since the mapping of the memory space of the PNOR portion 52 to the RAM memory 16 in each zone can be set by the user, and the total amount of RAM memory 16 is known, the boundary between the PNOR portion 52 and the RAM portion 54 is indirectly set by the user. Thus, if it is desired to have a large amount of buffer, a larger amount of the RAM portion 54 can be allocated, by decreasing the mapping between the PNOR portion 52 and the RAM memory 16 in one or more of the zones. In addition, the boundary between the PNOR portion 52 and the RAM portion 54 can be changed during operation of the memory device 10, by resetting the memory controller 12, and re-establishing the mapping between the memory space of the PNOR portion 52 and the RAM memory 16, in each zone.

The boundaries for the memory map for each of the zones of the RAM memory 16 and the size of the memory space of the PNOR portion 52 can be pre-assigned and stored in the non-volatile configuration registers 60 in the memory controller 12. Access to the configuration registers 60 is through the configuration access portion 56. The non-volatile configuration registers 60 may be a part of the embedded NOR memory 62. Alternatively, the boundaries for the memory map for each of the zones of the RAM memory 16 and the size of the memory space of the PNOR portion 52 can be selected by a user through one or more chip select pins. In that event, as the memory controller 12 is powered up, the boundaries for the different memories can be re-set. The NOR memory 62 can also store the firmware code 61 used for execution by the memory controller 12, during boot up and for operation of the memory controller 12 and the MCU 64.

Finally, in the Mass Storage Access section 58, when the host device 20 accesses that section of the memory space, the host device 20 believes that it is accessing an ATA disk drive. The memory controller 12 translates the logical ATA disk drive space addresses, into a NAND memory 14 physical space address using the well known Flash File System (FFS) protocol. In one embodiment, for a read operation, the beginning portion of the Mass Storage Access section 58 consists of a 16 byte logical address which is loaded into the ATA Task File Register 79. The memory controller 12 decodes the 16 bytes of task command and logical address and converts it into a physical address for accessing a particular "page" within the NAND memory 14. The page of 512 bytes from a page in the NAND memory 14 is read and is then loaded into the Data Registers 81, where they are accessed by the host device 20, either sequentially or randomly. For a write operation, the reverse occurs. The logical address of where the 512 bytes of data are to be stored are first loaded into the Task File Registers 79. A write command is written into the Task File Register 79. The memory controller 12 decodes the command in the Task File Registers as a write command and converts it into a physical address to access the particular page in the NAND memory 14, and stores the 512 bytes in the Data Registers 81 at that location. In another embodiment, there may be two data registers 81(*a* & *b*) (not shown) in a so-called ping-pong configuration. In that event, one of the Data Registers 81*a* is used to supply 512 bytes of data to the host device 20 with data previously loaded from one page of the NAND memory 14, while the other Data Register 81*b* is used to load data from another page of the NAND memory 14 into the Data Register 81*b*, to supply the data to the host device 20 after the data from the Date Registers 81*a* have been completely read out. In this manner, continuous read operation across many of pages of data from the NAND memory 14 can occur. The Data Registers 81(*a* & *b*) can also be used in a ping-pong fashion for a write operation, so that many continuous pages of data can be written into the NAND memory 14 with little or no latency set up time.

As previously discussed, the interface between the memory device 10 and the host device 20 can be via a serial bus. In particular, such a serial bus might connect the NOR or PNOR area of the memory device 10 with the host device 20 with a conventional parallel bus connecting the RAM portion of the memory device 10 with the host device 20.

Referring to FIG. 3 there is shown a detailed block level diagram of the memory controller 12 interfaced with the RAM memory 16 and the NAND memory 14. The memory controller 12 comprises a microcontroller 64. The microcontroller 64 performs or executes all bookkeeping functions of the FFS. In addition, it performs or executes Defect Management (DM) and cache data coherence algorithms, and cache flush replacement algorithms. Finally, the microcontroller 64 performs or executes cache paging scheme algorithms. All of these operations are accomplished by firmware or program code 61 stored in the NOR memory 62, including the boot up operation or the initialization of the memory controller 12.

The microcontroller 64 is connected to a second NOR memory 62, which as previously discussed also stores the firmware 61 for execution by the microcontroller 64. In addition to storing the non-volatile configuration registers 60, the NOR memory 62 also stores the firmware for operations of FFS and DM.

The microcontroller 64 also interfaces with the SRAM memory 46 through the MUX 74. The SRAM memory 46 serves as a local high speed buffer for the microcontroller 64 to store runtime data. In addition, the SRAM memory 46 can store defect map cache, and FFS data structure.

Although, the detailed description of the memory controller 12 is described with respect to hardware components, all of the functions described hereinafter may also be implemented in software, for execution by the microcontroller 64.

The memory controller 12 comprises a current cache page address registers 66 which may be implement in the nature of a content addressable memory 66. The function of the CAM 66 is to keep current PNOR cache page addresses and to update the CAM 66 when there is an access miss during either a read or write operation to the PNOR portion 52. Each entry within the CAM 66 has three portions: a page address portion 66*a*, an index address portion 66*b*, and a status portion 66*c*. The discussion that follows with regard to the operation of the memory controller and the CAM memory 66 is with regard to the following example, although it should be understood that the invention is not limited to the following example. It is assumed that the address from the host device 20 is 32 bits, comprising of 21 most significant bits (bits 11-31) and 11 least significant bits (bits 0-10). The 21 most significant bits comprises a page address, while the 11 least significant bits comprises an offset address. Each entry in the CAM memory 66 also comprises the page address portion 66*a* comprising of 21 bits, the index address portion 66*b* comprising of 9 bits, and the status portion comprising of 12 bits, which consist of 1 bit of valid (or not); 1 bit of dirty (or clean); 1 bit of static (or dynamic); 1 bit of host initiated cache coherence (or controller initiated); and 8 bits for last access time stamp. With 32 bits from the host device 20, the host device can address $2^{32}$ Bytes or 1 GB amount of memory space. As will be discussed hereinafter, the memory controller 12 uses the index address portion of 9 bits from the CAM memory 66 along with the 11 bits from the offset address from the host device 20 to form a 20 bit address thereby enabling the addressing of 1 MB to the RAM 16. Of course, these numbers are by way of example only and do not limit the present invention.

The memory controller 12 also comprises a Hit/Miss compare logic 68. The Hit/Miss compare logic 68 receives the address signals from the address bus 22, and the control signals from the control bus 32. The Hit/Miss compare Logic 68 then sends the 21 bits of the page address from the 32 bits of address from the host device 20 to the CAM memory 66. The CAM memory 66 compares those 21 bits of page address with page address 66*a* stored in each entry of the CAM memory 66. If there is a HIT, i.e. the 21 bits of the page address from the host device 20 matches one of the entries in the CAM memory 66, then the CAM memory 66 outputs the associated 9 bits of the index address 66*b*, to the MUX 70. If there is a Miss, the Hit/Miss compare logic 68 generates a read miss signal or a write miss signal. The read miss signal and the write miss signals are supplied to a Micro Code Controller (MCC)/Error Code Correction (ECC) unit 72 as signals for the MCC/ECC unit 72 to perform data coherence. The signal supplied to the MCC/ECC unit 72 is either a Hit: which indicates that one of current page address stored in the RAM memory 16 is the address from the host device 20 as supplied on the address bus 22, or a Miss: which indicates that none of the current page address stored in the RAM memory 16 is the address from the host device 20 as supplied on the address bus 22. Finally, the Hit/Miss compare logic 68 is also connected to the wait state signal 26. The wait state signal 26 is generated when the memory controller 12 desires to inform the host device 20 that the memory controller 12 desires to hold the bus cycle operation. The wait state signal 26 is de-asserted to release the buses 22/24/32 to permit the host device 20 to resume operation. One example of a wait state signal 26 being asserted by the memory controller 12 is when there is a read/write miss and the memory controller 12 needs to retrieve the data from the address in the NAND memory 14 and to load it into the RAM memory 16. During the time that the data is retrieved from the NAND memory 14 and loaded into the RAM memory 16, the wait state signal 26 is asserted by the memory controller 12.

The memory controller 12 also comprises a MCC/ECC unit 72, which operates under the control of the microcontroller 64. The MCC/ECC unit 72 monitors the read miss/write miss signals for cache data coherence, flush replacement, and paging operations. In addition, under the control of the microcontroller 64, it operates the NAND memory 14 and provides for the defect management operation of the NAND memory 14. Further, under the control of the microcontroller 64, the MCC/ECC unit 72 provides DMA function to move data between NAND memory 14, RAM memory 16, and SRAM memory 46. Finally, the MCC/ECC unit 72 performs error detection and correction on the data stored in the NAND memory 14.

The memory controller 12 also comprises a cryptograph engine 90, which provides for security and digital rights management. In addition, the memory controller 12 may have additional RAM memory 92 embedded therein, i.e. formed on the same integrated circuit die, to be used to augment the amount of RAM memory 16. As previously indicated the RAM memory 16 may be a separate integrated circuit die in which case the RAM memory 92 embedded in the memory controller 12 augments the RAM memory 16. However, if the RAM memory 16 and the memory controller 12 are integrated into the same die, then the RAM memory 16 and the RAM memory 92 may both be part of the same memory array.

The memory device 10 will now be described with respect to the various modes of operation. During power up, the Hit/Miss compare logic 68 generates the wait signal and asserts the wait state signal 26. The memory controller 12 reads the configuration parameters from the non-volatile registers 60 and loads them to the volatile registers 46 (which may be a part of the SRAM 46). The static pages, i.e. data from the NAND memory 14 which are statically mapped to the PNOR portion 52 will also be read from the NAND memory 14 and stored into the RAM memory 16. This is done by the microcontroller 64 through the MCC/ECC 72 executing the FFS protocol to translate the address of the page from the NAND memory 14 and to generate the physical address and control signals to the NAND memory 14 to retrieve the data therefrom and to store them into the RAM memory 16. During power up, the MCU 64 and the MCC/ECC 72 will also scan the NAND memory 14 to find the master index table. The master index table will be read and stored into the local SRAM memory 46. The MCU 64 will check the data structure integrity of the master index table. The MCU 64 and the MCC/ECC 72 will also scan the NAND memory 14 to determine if rebuilding of the master index table is required. The MCU 64 and the MCC/ECC 72 also will bring two pages of data from the NAND memory 14 into the local SRAM memory 64. The first two pages of data from the NAND memory 14, called Vpage contains data for mapping the logic address of the host device 20 to the physical address of the NAND memory 14 with the capability to skip defective sectors in the NAND memory 14. The FFS is then ready to accept mapping translation request. The Hit/Miss compare logic 68 then de-asserts the wait state signal 26, i.e. releases the wait state signal 26.

It should be noted that during power up, while the memory controller 12 is retrieving the static pages from the NAND memory 14 and storing them into the RAM memory 16, and performing other overhead functions, such as updating the master index table of the NAND memory 14, the memory device 10 is still available for use by the host device 20. In particular, the NOR memory 44 can be accessed by the host device 20 even during power up, since the assertion of the wait state signal 26 affects only those operations directed to address requests to the PNOR portion 52 of the memory space.

NOR Memory Operation

In a NOR memory 44 read operation, the host device 20 sends an address signal on the address bus 22 which is within the NOR memory access portion 50 of the memory space to the memory device 10. In addition, appropriate control signals are sent by the host device 20 on the control bus 32 to the memory device 10. Because the address signals are in a space other than in the PNOR memory access portion 52, the Hit/miss compare logic 68 is not activated, and the wait state signal 26 is not asserted. The address signals and the control signals are supplied to the NOR memory 44, where the data from the address supplied is read. The data is then supplied along the data bus to the MUX 84 and out along the data bus 24 to the host device 20, thereby completing the read cycle.

In a NOR memory 44 write or program operation, the host device 20 sends an address signal on the address bus 22 which is within the NOR memory access portion 50 of the memory space to the memory device 10. In addition, appropriate control signals are sent by the host device 20 on the control bus 32 to the memory device 10. Because the address signals are in a space other than in the PNOR memory access portion 52, the Hit/miss compare logic 68 is not activated, and the wait state signal 26 is not asserted. The address signals and the control signals are supplied to the NOR memory 44. The data and program commands to be written or programmed is sent along the data bus 24 from the host device 20 to the memory controller 12 and into the MUX 84. From the MUX 84, the data is then sent to the NOR memory 44, where the data is programmed into the NOR memory 44 at the address supplied on the address bus 22. The host device 20 can perform byte program operation allowing the NOR memory 44 to be programmed on a byte-by-byte basis. The write or program cycle is completed when the data is written into the NOR memory 44.

In NOR memory 44 erase operation, such as sector erase, or block erase, the host device 20 sends an address signal on the address bus 22 which is within the NOR memory access portion 50 of the memory space to the memory device 10. In addition, appropriate control signals are sent by the host device 20 on the control bus 32 to the memory device 10. Because the address signals are in a space other than in the PNOR memory access portion 52, the Hit/miss compare logic 68 is not activated, and the wait state signal 26 is riot asserted. The address signals and the control signals are supplied to the NOR memory 44. The data signal representing the erase command protocol is sent along the data bus 24 from the host device 20 to the memory controller 12 and into the MUX 84.

From the MUX 84, the data is then sent to the NOR memory 44, where the data is decoded by the NOR memory 44 and the erase operation is then executed. The erase cycle is completed when the NOR memory 44 completes the erase cycle.

PNOR Memory Operation—Read

In a PNOR memory read operation, the host device 20 sends an address signal on the address bus 22 which is within the PNOR memory access portion 52 of the memory space to the memory device 10. There are two possibilities: Read Hit and Read Miss.

In the case of a Read Hit, the page address portion of the address signals supplied on the address bus 22 are received by the Hit/Miss compare logic 68, and are compared to the addresses currently in the RAM memory 16, as stored in the CAM 66. If the page address supplied on the address bus 22 is within a page address stored in the CAM 66, then there is a hit. The Hit/Miss logic 68 activates the MUX 70 such that the address and control signals are then directed to the RAM memory 16, with the associated index address 66b from the CAM memory 66 concatenated with the offset address from the host device 20 to address the RAM memory 16. Data read from that lower address from the RAM memory 16 are then sent to the MUX 80 where they are then supplied to the MUX 84 (the default state for the MUX 80), which has been directed (not shown) by the Hit/Miss compare logic 68 to permit the data to be sent to the host device 20 along the data bus 24, thereby completing the read cycle.

In the case of a Read Miss, there are a number of possibilities. First, is the possibility called Read Miss without cache flush. In the event the comparison of the page address portion of the address signals from the address bus 22 to the page address register 66a from the CAM 66 results in a miss, i.e. the page address on the address bus 22 is not within the addresses of pages stored in the RAM memory 16, the Hit/Miss compare logic 68 then sends a read miss signal to the MCC/ECC unit 72 for the MCC/ECC unit 72 to initiate a read coherence cycle. In addition, the Hit/Miss compare logic 68 asserts a signal on the wait state signal 26. The MCC/ECC unit 72 under the control of the MCU 64 executes an FFS operation to translate the address supplied by the host device 20 into a physical address in the NAND memory 14. The MCC/ECC unit 72 then generates the appropriate address and control signals to the NAND memory 14, and the appropriate address and control signals to the RAM memory 16.

An entire page of data, including data from the address specified on the address bus 22 is read from the NAND memory 14 and is transferred through the MUX 80 and to the RAM memory 16, where it is written into an entire page of locations in the RAM memory 16 specified by the MCC/ECC unit 72, and is operated thereon by the MCC/ECC unit 72 to ensure the integrity of the data, through error correction checking and the like. The current page address registers of CAM 66 is then updated to add the address of the address page within the current read miss address. The Hit/miss compare logic 68 de-asserts the signal on the wait state signal 26. In addition, the MCU 64 switches the MUX 80 to the default position. The Hit/Miss compare logic 68 sends the index address 66b to the MUX 70 where it is combined with the offset address portion from the address bus 22, to address the RAM memory 16. The data from that read operation on the RAM memory 16 is then supplied through the MUX 80 and through the MUX 84 to the data bus 24 to the host device 20, thereby completing the cycle. Because the amount of data read from the NAND memory 14 is on a page basis, the entire page of data must be stored in the RAM memory 16. This scenario of Read Miss without cache flush assumes that either an entire page of RAM memory 16 is available to store the data from the NAND memory 14, or the location in the RAM memory 16 where an entire page of data is to be stored contains coherent data (same as the data in the NAND memory 14), then the entire page of data read from the NAND memory 14 can be stored in a location in the RAM memory 16. Cache flush means the writing of data from the RAM memory 16 to NAND memory 14, thereby flushing the cache (RAM memory 16) of the data coherence problem.

Another possible scenario of a Read Miss is called Read Miss with cache flush. In this scenario, an entire page of data from the NAND memory 14 cannot be stored in the RAM memory 16 without overwriting some data in the RAM memory 16 which is newer than the data in the NAND memory 14. This creates a data coherence problem. Thus, a page of data in the RAM memory 16 must first be written into the NAND memory 14, before the data from the NAND memory 14 in a different location can be read into the RAM memory 16. The sequence of operations is as follows. The page address portion of the address signal from the address bus 22 from the host device 20 is compared to the page address signals 66a from the CAM 66 to determine if the address signal from the address bus 22 is within any of the current page addresses. This comparison results in a miss, causing the Hit/Miss compare logic 68 to send a read miss signal to the MCC/ECC unit 72 for the MCC/ECC unit 72 to initiate a read coherence cycle. In addition, the Hit/Miss compare logic 68 asserts a signal on the wait state signal 26. The MCC/ECC unit 72 under the control of the MCU 64 determines that a page of data in the RAM memory 16 must first be written into the NAND memory 16 because there is a data coherence problem should the data from the NAND memory 14 be read into the RAM memory 16. The MCU 64 executes an FFS operation to translate the address from the RAM memory 16 into the address in the NAND memory 14.

An entire page of data is read from the RAM memory 16, passed through the MUX 80 and supplied to the NAND memory 14, where they are stored in the NAND memory 14. Thereafter, the address from the host device 20 is converted by an FFS operation into a physical NAND address by MCU 64. The MCC/ECC unit 72 then generates the appropriate address and control signals under the direction of MCU 64 to the NAND memory 14 and using the index address 66b from the CAM memory 66 and the control signals and the offset address portion from the MCC/ECC 72 to address the RAM memory 16. An entire page of data read from the NAND memory 14 is then transferred from the NAND memory 14 through the MUX 80 and to the RAM memory 16, where it is written into a page of locations in the RAM memory 16 specified by the MCC/ECC unit 72 and the index address 66b, and is operated thereon by the MCC/ECC unit 72 to ensure the integrity of the data, through error correction checking and the like. The current page address registers 66a of CAM 66 is then updated to add the page address which contains the current read miss address, along with it associated index address 66b. The Hit/miss compare logic. 68 de-asserts the signal on the wait state signal 26. In addition, the MCU 64 switches the MUX 80 to the default position. The Hit/Miss compare logic 68 sends the index address 66a to the MUX 70 where they are combined with the offset address from the address bus 22 to initiate a read operation in the RAM memory 16. The data is then read from the RAM memory 16 and supplied through the MUX 80 and through the MUX 84 to the data bus 24 to the host device 20, thereby completing the Read cycle.

In each of the cases of Read Hit, Read Miss without cache flush, and Read Miss with cache flush, from the host device 20 point of view, the operation is no different than a read to a RAM device, with latency in the case of a Read Miss. The host device 20 does not have to deal with address translation and/or data coherence.

PNOR Memory Operation—Write

In a PNOR memory write operation, the host device 20 sends an address signal on the address bus 22 which is within the PNOR memory access portion 52 of the memory space to the memory device 10, along with the data to be written into the RAM memory 16. There are two possibilities: Write Hit and Write Miss.

In the case of a Write Hit, the page address portion of the address signals supplied on the address bus 22 are received by the Hit/Miss compare logic 68, and are compared to the page addresses 66a in the CAM 66, which reflect data currently stored in the RAM memory 16. The page address supplied on the address bus 22 is within a page address stored in the CAM 66. The Hit/Miss logic 68 activates the MUX 70 such that the address and control signals are then directed to the RAM memory 16. The index address 66b from the CAM 66 and the offset address portion of the address signals from the address bus 22 are combined to produce an address signal used to access the RAM memory 16 through the MUX 70. Data from the data bus 24 is supplied through the MUX 84 through the MUX 80 is supplied to the RAM memory 16, where it is then written into the RAM memory 16, thereby completing the Write Hit cycle.

It should be noted that the data in the RAM memory 16, after the Write Hit operation will not be coherent with respect to the data from the same location in the NAND memory 14. In fact, the data in the RAM memory 16 will be the most current one. To solve the problem of data coherency, there are two solutions.

First, the memory device 10 can automatically solve the problem of data coherence, on an as needed basis. As discussed previously, for example, in the case of a Read Miss with Cache Flush operation, data that is more current in the RAM memory 16 will be written back into the NAND memory 14 if the pages of data in the RAM memory 16 need to be replaced to store the newly called for page of data from the NAND memory 14. As will be discussed hereinafter, the MCU 64 will also perform a cache flush on the data in the RAM memory 16 by writing the data back into the NAND memory 14 in a Write Miss with Cache Flush operation.

An alternative solution to the problem of data coherence is to perform data coherence under the control of the host device 20. Thus, the host device 20 can issue a cache flush command causing the memory controller 12 to write data that is not coherent from the RAM memory 16 back into the NAND memory 14. The advantage of this operation is that it can be done by the host device 20 at any time, including but not limited to critical events such as changing application, shutdown, or low power interruption received. However, because the memory controller 12 also can perform data coherence automatically, in the event the user of the host device 20 fails to perform the data coherence operation, such operation will also be performed as needed by the memory controller 12.

In the case of a Write Miss, there are a number of possibilities. First, is the possibility called Write Miss without cache flush. In the event the comparison of the page address portion of the address signals from the address bus 22 to the page address signals 66a from the CAM 66 results in a miss, i.e. the address on the address bus 22 is not within the addresses of pages stored in the RAM memory 16, the Hit/Miss compare logic 68 then sends a write miss signal to the MCC/ECC unit 72. In addition, the Hit/Miss compare logic 68 asserts a signal on the wait state signal 26. The MCC/ECC unit 72 determines if a new page of data from the NAND memory 14, including the data at the address specified on the address bus 22 from the host device 20, will store over either old coherent data, or a blank area of the RAM memory 16. In that event, there is no need for the memory controller 12 to perform a write coherence cycle before transferring the data from the NAND memory 14 to the location in the RAM memory 16. The MCC/ECC unit 72 under the control of the MCU 64 executes an FFS operation to translate the address supplied by the host device 20 into a physical address in the NAND memory 14. The MCC/ECC unit 72 then generates the appropriate address and control signals to the NAND memory 14, and the appropriate address and control signals to the RAM memory 16.

An entire page of data, including data from the address specified on the address bus 22, is read from the NAND memory 14 and is transferred through the MUX 80 and to the RAM memory 16, where it is written into an entire page of locations in the RAM memory 16 specified by the MCC/ECC unit 72 and the index address 66b, and is operated thereon by the MCC/ECC unit 72 to ensure the integrity of the data, through Terror correction checking and the like. The current page address registers 66a of CAM 66 is then updated to add the address of the address page within the current write miss address and the associated index address 66b (the index address 66b being the upper 9 bits of the address in the RAM memory 16 where the page of data is stored). The Hit/miss compare logic 68 de-asserts the signal on the wait state signal 26. In addition, the MCU switches the MUX 80 to the default position. The Hit/Miss compare logic 68 sends the index address 66b to the MUX 70 where they are combined with the offset address from the address 22, to initiate a write operation in the RAM memory 16. The data is then written into the RAM memory 16 from the host device 20 through the MUX 84 and through the MUX 80, thereby completing the cycle. The data in the RAM memory 16 is now no longer coherent with the data at the same address in the NAND memory 14. This coherence problem be solved by either the memory controller 12 initiating a write cache flush, automatically on an as needed basis, or by the host device 20 initiating a write cache flush, at any time, all as previously discussed.

Another possible scenario of a Write Miss is called Write Miss with cache flush. In this scenario, an entire page of data from the NAND memory 14 cannot be stored in the RAM memory 16 without overwriting some data in the RAM memory 16 which is newer than the data in the NAND memory 14. This creates a data coherence problem. Thus, a page of data in the RAM memory 16 must first be written into the NAND memory 14, before the data from the NAND memory 14 in a different location can be read into the RAM memory 16. The sequence of operations is as follows. The page address portion of the signal from the address bus 22 from the host device 20 is compared to the page address signals 66a from the CAM 66 to determine if the address signal from the address bus 22 is within any of the current page addresses. This comparison results in a miss, causing the Hit/Miss compare logic 68 to send a write miss signal to the MCC/ECC unit 72 for the MCC/ECC unit 72 to initiate a write coherence cycle. In addition, the Hit/Miss compare logic 68 asserts a signal on the wait state signal 26. The MCC/ECC unit 72 under the control of the MCU 64 determines that a page of data in the RAM memory 16 must first be written into the NAND memory 16 because there is a data coherence problem should the data from the NAND memory 14 be read into the RAM memory 16. The MCU unit 64 executes an FFS operation to translate the address from the RAM memory 16 into the address in the NAND memory 14.

An entire page of data is read from the RAM memory 16, passed through the MUX 80 and supplied to the NAND memory 14, where they are stored in the NAND memory 14. Thereafter, the address from the host device 20 is converted by an FFS operation into a physical NAND address. The MCC/ECC unit 72 then generates the appropriate address and control signals to the NAND memory 14 using the physical NAND address from the FFS, and the index address and control signals to the RAM memory 16. An entire page of data read from the NAND memory 14 is then transferred from the NAND memory 14 through the MUX 80 and to the RAM memory 16, where it is written into a page of locations in the RAM memory 16 specified by the offset address from the MCC/ECC unit 72 and the index address from the index address register 66b, and is operated thereon by the MCC/ECC unit 72 to ensure the integrity of the data, through error correction checking and the like. The current page address registers of CAM 66 is then updated to add the page address 66a which contains the current read miss address, and the associated index address 66b. The Hit/miss compare logic 68 de-asserts the signal on the wait state signal 26. In addition, the MCU switches the MUX 80 to the default position. The Hit/Miss compare logic 68 sends the index address 66b to the MUX 70 where they are combined with the offset address from the address bus 22 to form an address to write in the RAM memory 16. The data is then written into the RAM memory 16 from the host device 20 to the data bus 24 through the MUX 84 and through he MUX 80. Similar to the foregoing discussion for Write Miss without Cache Flush, the data in the RAM memory 16 is now more current and a data coherence problem is created, which can be solved by either the host device 20 initiating a cache flush, or the memory controller 12 initiating a cache flush operation.

In each of the cases of Write Hit, Write Miss without cache flush, and Write Miss with cache flush, from the host device 20 point of view, the operation is no different than a write to a RAM device, with latency in the case of a Write Miss. The host device 20 does not have to deal with address translation and/or data coherence.

To further reduce the latency time in the event of a Read Miss with cache flush or a Write Miss with cache flush, caused by the need to first perform a write operation to the NAND memory 14 from the RAM memory 16 to solve the data coherence problem, the following can be implemented. The page of data that is to be written into the NAND memory 14 is first written into the local SRAM 46 from the RAM memory 16. This is a much faster operation than writing directly into the NAND memory 14. Thereafter, the Read Miss with Cache Flush or Write Miss cache flush operation continues as if it were a Read Miss without cache flush or Write Miss without Cache Flush operation. After the Read Miss or Write Miss operation is completed, the data stored in the local SRAM 46 can be written into the NAND memory 14 in background operation when the memory device 10 is idle or access is limited to operation in the NOR memory access portion 50 or RAM memory access portion 54 or the configuration register access portion 56.

It should be noted that in a PNOR operation, from the host device 20 point of view, the operation is no different than executing to a RAM memory, with the data being non-volatile, but without the host device 20 issuing NOR protocol commands, such as Sector or Block ERASE. However, it is also within the present invention that the memory device 10 can emulate NOR operation using RAM memory 16 and NAND memory 14. In that event the memory space mapping for the NOR memory access portion 50 would extend to more than just mapping to the NOR memory 44. The NOR memory access portion 50 can be mapped to a portion of the RAM memory 16, with the RAM memory 16 mapped to the NAND memory 14 statically thereby presenting no latency problem during access. The data from the NAND memory 14 would be loaded into the RAM 16 on power up, and read/write to the NOR memory access portion 50 would be reading from or writing to the RAM memory 16. The only other change would be for the memory controller 12 to be responsive to the NOR protocol commands. As previously discussed, when such NOR protocol commands are issued by the host device 20, they are supplied as a sequence of unique data patterns. The data, supplied on the data bus 24 would be passed through the MUX 84 through the MUX 80. Because the address supplied on the address bus indicates that the operation is to be in a NOR memory access portion 50 emulated by RAM memory 16, the MUX 74 is switched permitting the MCU 64 to receive the data pattern. Once that data pattern is decoded as a NOR command, the MCU operates the NAND memory 14 with those NOR commands, if for example the command is erase. Of course, the RAM memory 16, being volatile memory does not have to be "erased". Thus, the execution of the NOR protocol commands would result in a faster operation by a RAM memory 16 emulating NOR memory 44 than a true NOR memory 44 executing the NOR protocol commands. Further, the emulation need not emulate the full set of NOR protocol commands. Instead, the controller 12 can emulate a partial set of the NOR protocol commands. Therefore, as used herein, the term "NOR protocol commands" means one or more commands from the full set of NOR protocol commands, promulgated by e.g. Intel or AMD.

RAM Memory Operation

In a RAM memory 16 read operation, the host device 20 sends an address signal on the address bus 22 which is within the RAM memory access portion 54 of the memory space to the memory device 10. In addition, appropriate control signals are sent by the host device 20 on the control bus 32 to the memory device 10. Because the address signals are in the RAM memory access portion 54, the Hit/miss compare logic 68 activates the MUX 70 to permit the address/control signals from the address bus 22 and control bus 32 to be supplied to the RAM memory 16. However, the wait state signal 26 is not asserted. In addition, the address from the host device 20 is decoded and from an address signal which is supplied to the RAM memory 16 along with the control signal from the control bus 32, where the data from the address supplied is read. The data is then supplied along the data bus to the MUX 80 and the MUX 84 and out along the data bus 24 to the host device 20, thereby completing the read cycle.

In a RAM memory 16 write operation, the host device 20 sends an address signal on the address bus 22 which is within the RAM memory access portion 54 of the memory space to the memory device 10. In addition, appropriate control signals are sent by the host device 20 on the control bus 32 to the memory device 10. Because the address signals are in the RAM memory access portion 54, the Hit/miss compare logic 68 activates the MUX 70 to permit the address/control signals from the address bus 22 and control bus 32 to be supplied to the RAM memory 16. However, the wait state signal 26 is not asserted. In addition, the address from the host device 20 is decoded and form an address signal which is supplied to the RAM memory 16 along with the control signal from the control bus 32, where the data from the data bus 24 is written into the RAM memory 16 at the address supplied.

From the perspective of a host device 20, the operation of read or write in the RAM memory access portion is no different than accessing a RAM device with no latency.

Configuration Register Operation

In a Configuration Register operation, the host device 20 sends an address signal on the address bus 22 which is within the Configuration register access portion 56 of the memory space to the memory device 10. In addition, appropriate control signals are sent by the host device 20 on the control bus 32 to the memory device 10. The data is then written into the Non-Volatile Registers 60.

NAND Memory Operation

In a NAND memory 14 read operation, the host device 20 sends an address signal on the address bus 22 which is within the Mass Storage Access section 58 or ATA memory access portion 58 of the memory space to the memory device 10. In addition, appropriate control signals are sent by the host device 20 on the control bus 32 to the memory device 10. Because the address signals are in a space other than in the PNOR memory access portion 52, the Hit/miss compare logic 68 is not activated, and the wait state signal 26 is not asserted. The host device 20 follows the ATA protocol to read/write to task file registers 79 for an ATA read/write command. The task file registers 79 contain registers to store: command, status, cylinder, head, sector etc. The MCC/ECC unit 72 under the control of the MCU 64 operates the Flash File System which translates host logical address to NAND physical address, with the capability to avoid using defective NAND sectors. Reference is made to U.S. Pat. Nos. 6,427,186; 6,405,323; 6,141,251 and 5,982,665, whose disclosures are incorporated by reference in their entirety. Each logical address from the host device 20 has an entry in a table called Vpage. The contents of the entry points to the physical address where the logical address data is stored.

To read a page of data from the NAND memory 14, the address signals and the control signals are supplied to the NAND memory 14. The host device 20 follows the ATA protocol with the task file registers 79 storing the command and the logical address. Each sector size is 512 bytes. The host device 20 checks for the readiness of the memory 10 by reading the status register 79 which is in the task file register access portion 58 of the memory space. The host device 20 writes the "read" command into the command registers 79, within the memory space 58. The MCU 64 performs an FFS translation of the logical address to a physical address and the MCC/ECC unit 72 under the control of the MCU 64 reads the data from the NAND memory 14, and transfers pages of data into the buffer 81. After the entire page of data is stored in the Data Registers 81, and is operated thereon by the MCC/ECC unit 72 to ensure the integrity of the data, through error correction checking and the like, the data is read out of the memory controller 12 along the data bus 24.

An operation to write into the NAND memory 14 is similar to an operation to read from the NAND memory 14. The host device 20 checks for the readiness of the memory 10 by reading the status register 79 which is in the task memory space 58 portion. The host device 20 writes one page of data into the Data register 81, and then writes the "write" command into the command registers 79, along with the logical address. Thereafter, the MCU 64 using the FFS converts the logical address to a physical address and the MCC/ECC unit 72 under the control of the MCU 64 writes the one page of data from the ATA buffer 81 into the NAND memory 14.

The FFS updates a page of data by locating the physical address of the page to be updated. FFS finds an erased sector as a "buffer sector" or if there is no erased sector, it first performs an erase operation on a sector. FFS then reads the old data which has not been modified and programmed to the buffer sector. FFS then programs the updated page data. It then waits for the next request. If the next page is on the same erase sector, FFS continues the update operation. If the next page is outside of the transferring erase sector, the rest of the unmodified data will be copied to the buffer sector. The mapping table entry is changed to the buffer sector physical address. A new page update operation is then started.

Figure 4:
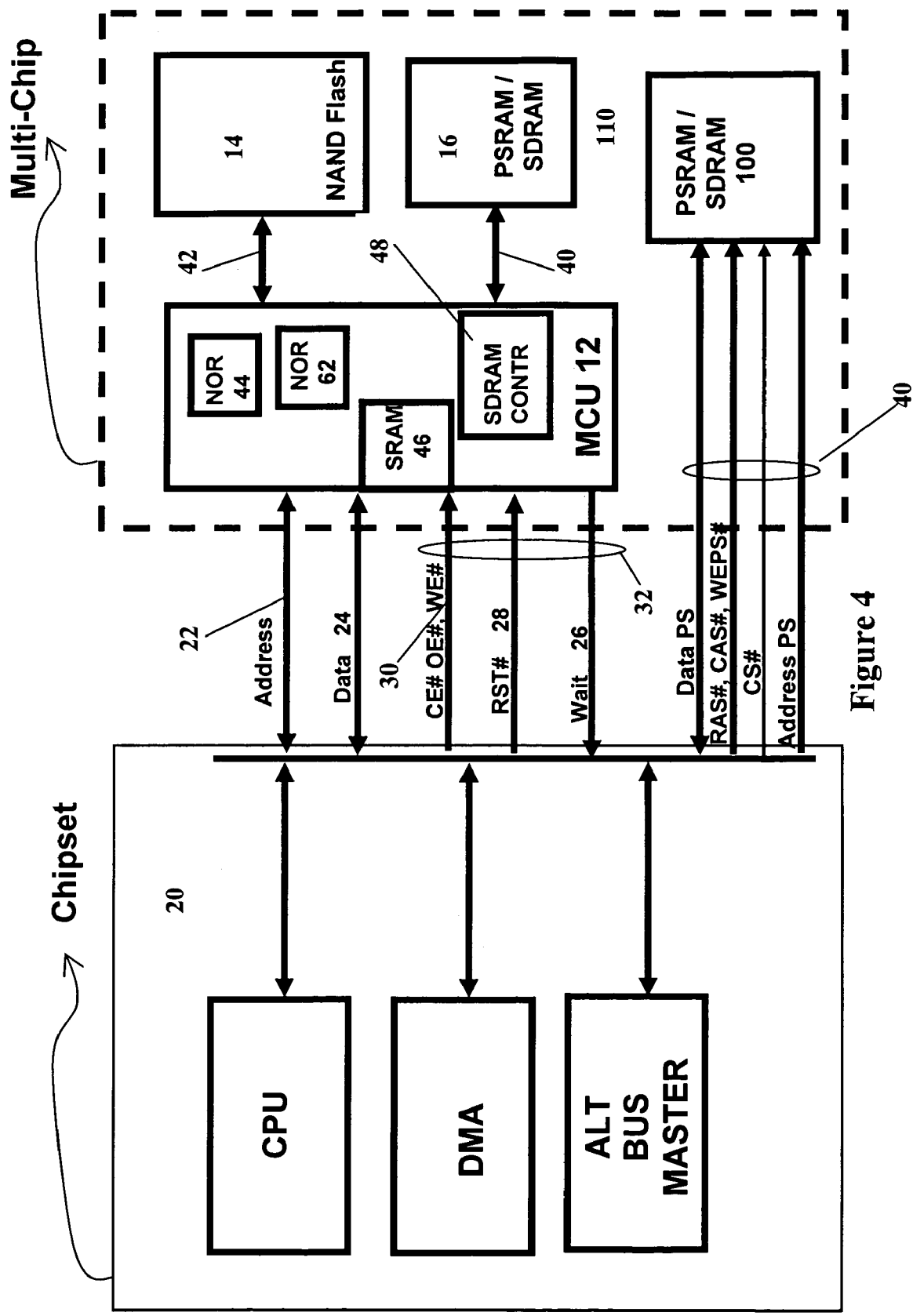
FIG. 4 is a block level diagram of a second embodiment of a memory device, including the memory controller, connected to a host system or user.

Referring to FIG. 4 there is shown a second embodiment of a memory device 110. The memory device 110 is similar to the memory device 10 shown in FIG. 1. Thus, like parts with like numerals will be designated. The only difference between the memory device 110 and the memory device 10 is that in the memory device 100, the second RAM bus 40 connects the RAM memory 100 directly to the host device 20, rather then to the memory controller 12. Thus, in the memory device 110, the host device has direct access and control of the RAM memory 100.

Figure 5:
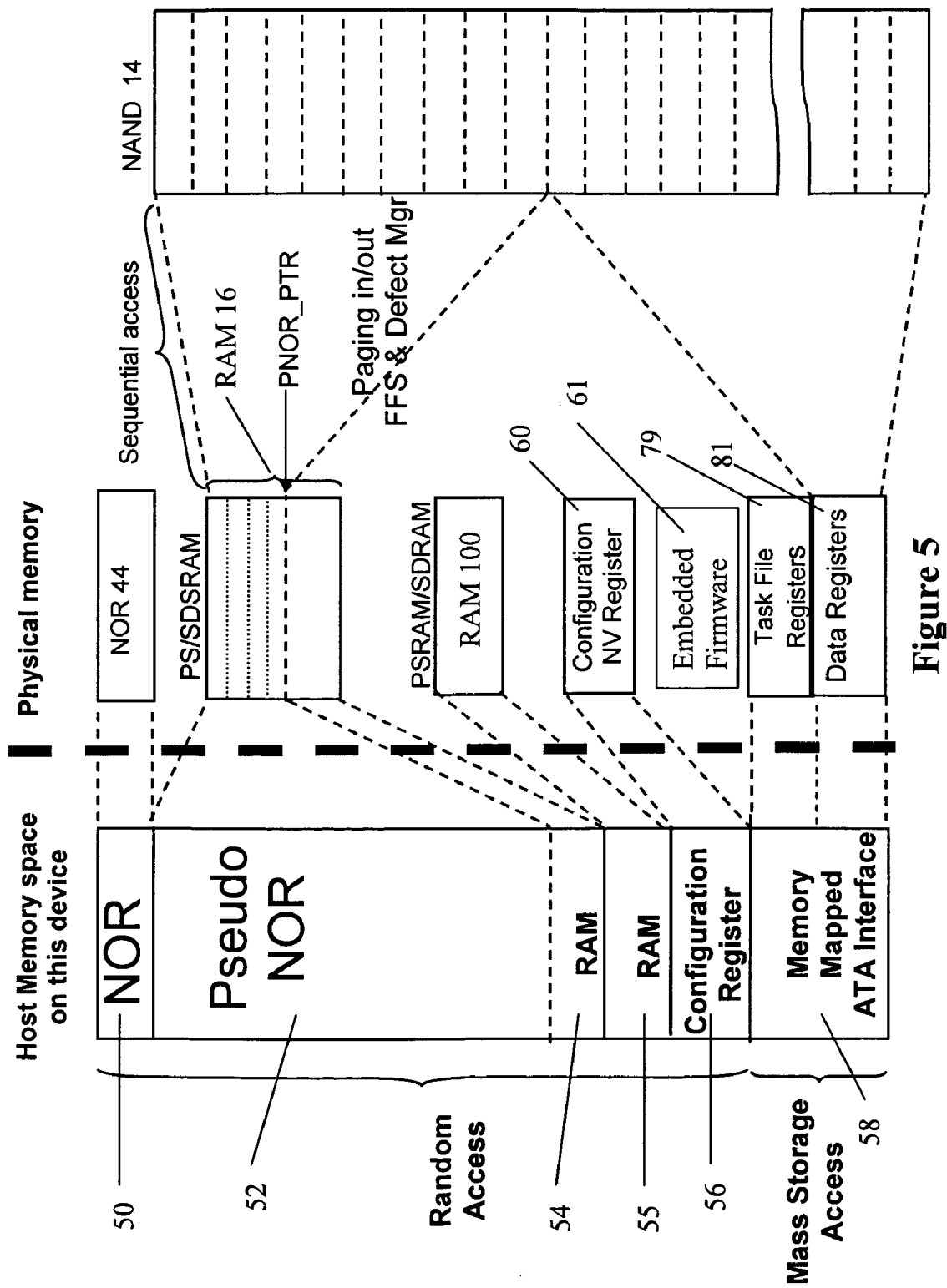
FIG. 5 is a memory mapping diagram showing the mapping of the address space as seen by the host or the user external to the memory device of FIG. 4 to the NOR memory, the RAM memory and the NAND memory in the second embodiment of the memory device, shown in FIG. 4.

This difference between the embodiment of the memory device 10 and the embodiment of the memory device 110 is reflected in the memory mapping shown in FIG. 5. Similar to the memory device 10, the memory mapping for the memory device 110 comprises a NOR memory access portion 50 which is mapped to the NOR memory 44, a PNOR memory access portion 52 which is mapped to the RAM memory 16 in the memory device 110, which is then mapped to the NAND memory 14, and a RAM memory access portion 54 mapped to the RAM memory 16. However, with the RAM memory 100 being directly accessible by the host device 20 through the second RAM bus 40, the memory mapping for the memory device 110 also includes another RAM memory access portion 55, which maps directly to the RAM memory 100. The memory device 110 then further comprises the configuration register access portion 56, and finally an ATA memory access portion 58, similar to that described for the memory device 10.

With the memory controller 12 interfacing with the host device 20 and with the NAND memory 14, the memory device 10 offers more protection than the memory devices of the prior art. In particular, the memory controller 12 can limit access to certain data stored in the NAND memory 14, as in concerns relating to Digital Rights Management. Further the memory controller 12 can encrypt the data stored in the NAND memory 14 to protect sensitive data. Finally, the memory controller 12 can offer protection against accidental erasure of data in certain portion(s) of the NAND memory 14. Finally with the program stored in NOR memory 62 the memory controller 12 is a self-starting device in that it does not require initial commands from the host device 20.

There are many aspects of the present invention. First, the memory device 10 or 110 is a universal memory device. The memory device has a memory controller which has a first address bus for receiving a RAM address signals, a first data bus for receiving RAM data signals, and a first control bus for receiving RAM control signals. The memory controller has NOR memory embedded therein and further has a second address bus for interfacing with a volatile RAM memory, a second data bus for interfacing with the volatile RAM memory, and a second control bus for interfacing with the volatile RAM memory. The controller further has a third address/data bus for interfacing with a non-volatile NAND memory, and a third control bus for interfacing with non-volatile NAND memory. The memory device further having a RAM memory connected to said second address bus, said second data bus, and said second control bus. The memory device further having a non-volatile NAND memory connected to the third address/data bus and to the third control bus. The controller is responsive to address signals supplied on the first address bus whereby the NOR memory is responsive to a first address range supplied on the first address bus, whereby the RAM memory is responsive to a second address range supplied on the first address bus, and whereby the NAND memory is responsive to a third address range supplied on the first address bus.

In yet another aspect of the present invention, the memory device is a universal memory device, wherein the user can defined the memory space allocation. The memory device has a memory controller which has a first address bus for receiving a RAM address signals, a first data bus for receiving RAM data signals, and a first control bus for receiving RAM control signals. The memory controller has NOR memory embedded therein and further has a second address bus for interfacing with a volatile RAM memory, a second data bus for interfacing with the volatile RAM memory, and a second control bus for interfacing with the volatile RAM memory. The controller further has a third address/data bus for interfacing with a non-volatile NAND memory, and a third control bus for interfacing with non-volatile NAND memory. The memory device further having a RAM memory connected to said second address bus, said second data bus, and said second control bus. The memory device further having a non-volatile NAND memory connected to the third address/data bus and to the third control bus. The memory device is responsive to the user defined memory space allocation wherein in a first address range supplied on the first address bus, the memory device is responsive to NOR memory operation including being responsive to NOR protocol commands, and a second address range supplied on the first address bus, the memory device is responsive to RAM operation, and a third address range supplied on the address bus, the memory device is responsive to the NAND memory operating as an ATA disk drive device, wherein the first, second and third address ranges are all definable by the user In yet another aspect of the present invention, memory device has a memory controller which has a first address bus for receiving a RAM address signals, a first data bus for receiving RAM data signals, and a first control bus for receiving RAM control signals. The memory controller further has a second address bus for interfacing with a volatile RAM memory, a second data bus for interfacing with the volatile RAM memory, and a second control bus for interfacing with the volatile RAM memory. The controller further has a third address/data bus for interfacing with a non-volatile NAND memory, and a third control bus for interfacing with non-volatile NAND memory. The memory device further having a RAM memory connected to said second address bus, said second data bus, and said second control bus. The memory device further having a non-volatile NAND memory connected to the third address/data bus and to the third control bus. The controller further having means to receive a first address on the first address bus and to map the first address to a second address in the non-volatile NAND memory, with the volatile RAM memory serving as cache for data to or from the second address in the non-volatile NAND memory, and means for maintaining data coherence between the data stored in the volatile RAM memory as cache and the data at the second address in the non-volatile NAND memory.

In another aspect of the present invention, the memory device has a memory controller which has a first address bus for receiving a NOR address signals, a first data bus for receiving NOR data signals and data protocol commands, and a first control bus for receiving NOR control signals. The memory controller further has a second address bus for interfacing with a volatile RAM memory, a second data bus for interfacing with the volatile RAM memory, and a second control bus for interfacing with the volatile RAM memory. The controller further has a third address/data bus for interfacing with a non-volatile NAND memory, and a third control bus for interfacing with non-volatile NAND memory. The memory device further having a RAM memory connected to said second address bus, said second data bus, and said second control bus. The memory device further having a non-volatile NAND memory connected to the third address/data bus and to the third control bus. The controller further operating the RAM memory to emulate the operation of a NOR memory device including NOR protocol commands.

Figure 6:
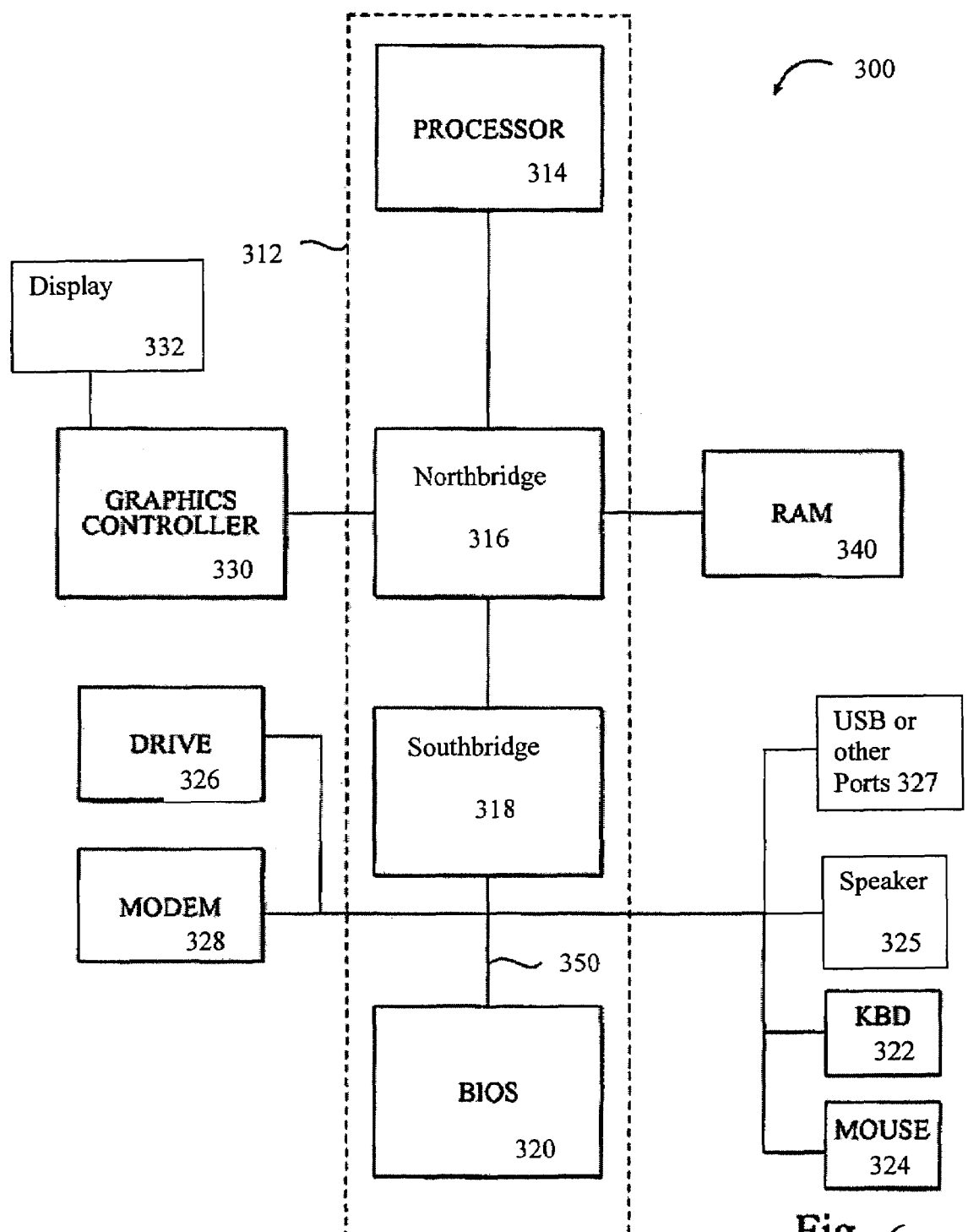
FIG. 6 is a block level diagram of a computer system in accordance with the "IBM PC" architecture of the prior art.

One of the uses of the memory 10 or 110 of the present invention is in the PC system 300 shown in FIG. 6. The memory device 10 or 110 can function in the following modes.

First, memory 10 or 110 can replace the DRAM 340. Since the memory 10 or 110 has a RAM portion, it can replace the DRAM 340. Furthermore, because the memory 10 or 110 also has a non-volatile portion, the memory 10 or 110 can store certain software in its NAND memory 14, such that upon boot up of the PC 300, the software can be immediately read from the NAND flash memory 14 through the controller 12 of the memory 10 or 110 and executed by the processor 314 without it being retrieved from the HDD 326. In addition, certain data or program that is frequently used by a user, as monitored by the operating system can also be pre-fetched from the HDD 326 and stored in the NAND 14 or NOR memory 44 portion of the memory 10 or 110, thereby saving time during operation as perceived by the particular user. Finally, the memory 10 or 100 can be used as a disk cache for the data/program from the HDD 326.

Second, the memory 10 or 110 can replace the BIOS 320. Because the memory 10 or 110 is operable in a NOR manner, the memory 10 or 110 can replace the BIOS 320 and can be used to store the start up code that the processor 314 requires to start the PC 300. The interface to the Southbridge 318 from the BIOS 320 can be serial or parallel. In addition, the memory 10 or 110 can be partitioned into at least two parts: one part for storing the BIOS code and the other part to store code for the operating system. In that event, start up of the PC 300 may be more rapid since some of the operating code is in non-volatile memory portion of the memory 10 or 110 rather than being stored on HDD 326. The controller 12 can provide security access to authorize one or the other portion. When operating in this mode, the memory 10 or 110 need not contain any RAM 16. The memory 10 or 110 can be simply the controller 12 with a small amount of NOR memory 44 and a NAND Flash memory 14, and need not contain any RAM 16 or be able to operate in a Pseudo NOR mode. Further, not all of the BIOS 320 instructions need to be stored in the NOR memory 44. Some of the instructions for the BIOS 320 can be stored in the NOR memory 44 with the remainder stored in the NAND Flash memory 14.

Figure 7A:
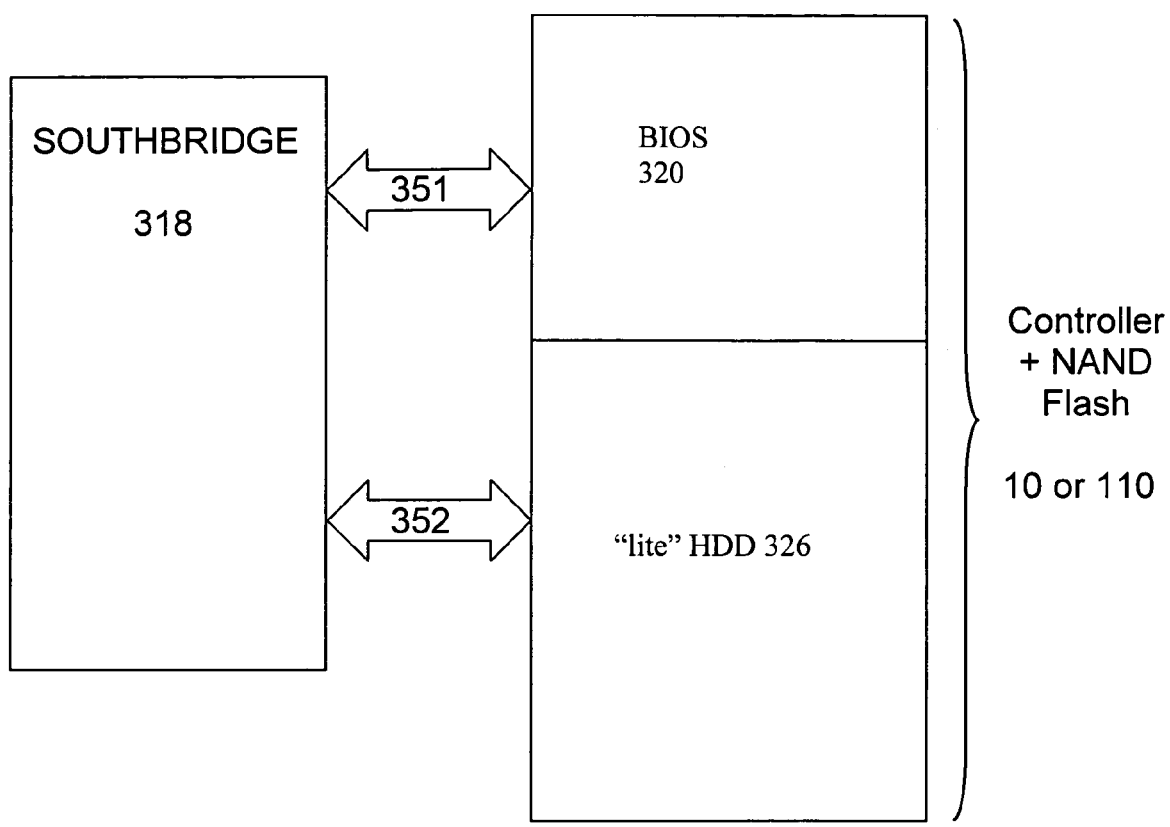
FIGS. 7a, 7b and 7c are block level diagrams showing the connection and use of a memory device in accordance with either the first or second embodiment with components of the "IBM PC" shown in FIG. 6.

Third, the memory 10 or 110 can replace the BIOS 320 and with the bus 350 divided into two buses: a first bus 351, parallel or SPI (serial) from the Southbridge 318 to the BIOS 320, and a second bus 352: an industry standard ATA bus from the Southbridge 318 to the BIOS 320, as shown in FIG. 7A. In this mode, which is a variation of the second mode described above, the memory 10 or 100 need not contain any RAM 16. In addition to the functions of storage and retrieval of the BIOS instructions, because the memory 10 or 110 also has an ATA bus, it can be used as a "lite" HDD in applications where the PC system 300 is used as a thin client, not requiring an HDD 326. Thus, the memory 10 or 110 can function as both a storage of the BIOS instructions as well as storage or operating system or user data in the NAND Flash memory 14. Thus, as used herein, the bus 350 can mean any type of bus or group of buses, including but not limited to PCI, PCI express, USB, ATA etc.

Figure 7B:
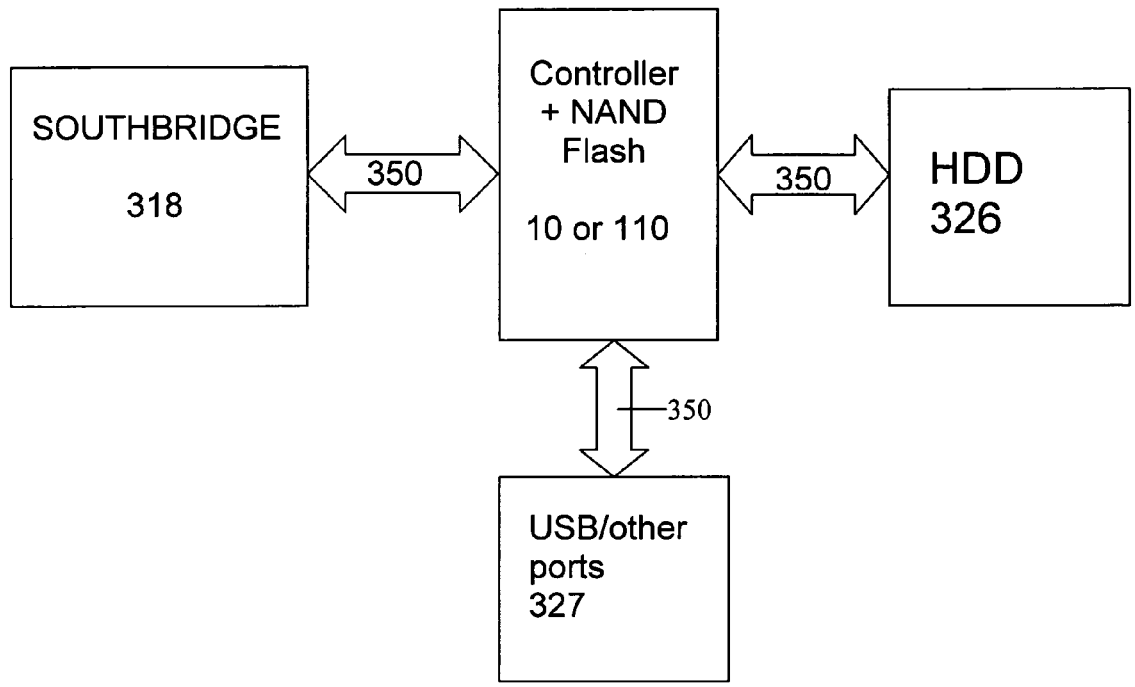
Figure 7C:
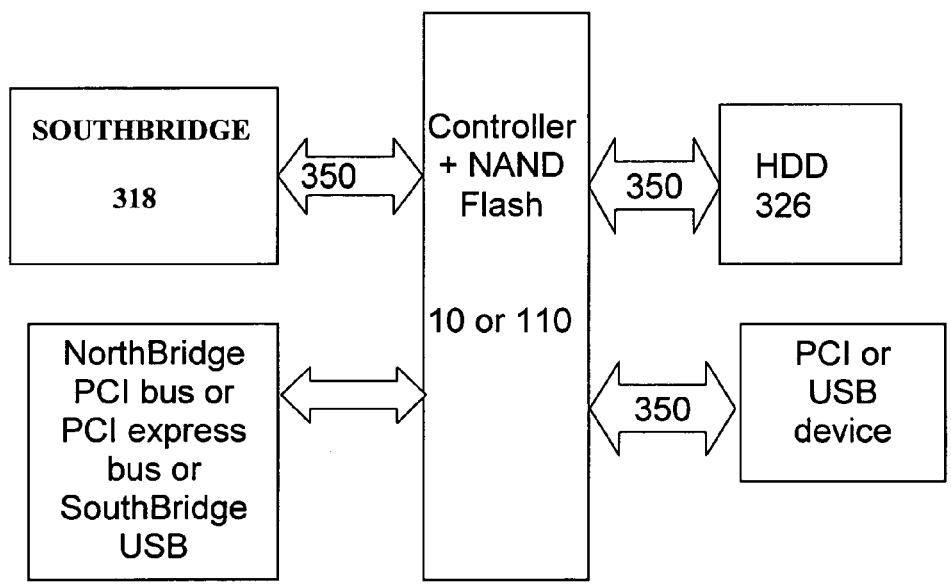

Fourth, the memory 10 or 100 can replace the BIOS 320 and with the bus re-routed such that the memory 10 or 100 is interposed between the signal from the Southbridge 318 to the HDD 326 or to the USB port 327 as shown in FIG. 7B. Because the memory 10 or 110 has a controller 12, there are three modes it can operate. First, it can be totally transparent, i.e. as if the memory 10 or 110 is not present, with the communication on the bus 350 directed from the Southbridge 318 to the HDD 326 or the USB port 327. Second, the memory 10 or 110 can "intelligently" listen to the signals representing command or data between the Southbridge 318 and the HDD 326 and "trap" or "capture" any such command or data. If the data requested by the Southbridge 318 is stored in the memory device 10 or 110, the memory device 10 or 110 can respond thereto without the HDD 326 responding. Thus, performance is improved by the memory device 10 or 110 acting as a cache for the HDD 326. It should be noted that this mode of operation does not require any special software driver. Third, the memory 10 or 110 can "trap" the command and re-transmit the command after analysis. Finally, with the PC 300 in an off mode, the MCU 12 and the memory device 10 or 110 can act as a host to the HDD 326 and control the operation thereof. This capability will be discussed in greater detail hereinafter. Here again, when operating in this mode, the memory 10 or 110 need not contain any RAM 16. The memory 10 or 110 can be simply a small amount of NOR memory 44 and a NAND Flash memory 14. Similar to the third mode of operation, the bus 350 that connects the Southbridge 318 to the BIOS 320 and to the Hard Drive 326 can comprise a group of buses such as: a parallel or SPI bus 351 for accessing the NOR memory 44 and an industry standard ATA bus 352 for accessing the NAND memory 14. The NOR flash memory 44 can serve to store instructions for BIOS 320, as previously discussed, when access to the BIOS 320 is along the parallel or SPI bus 351. In addition, because the NAND Flash memory 14 is cheaper than NOR memory 44, the NAND Flash memory 14 can be used to store the rest of the instructions for the BIOS 320 and retrieved into the MCU 12 and supplied along the parallel or SPI bus 351. In addition, the NAND flash memory 14 can be used to store cache data from the Hard Disk Drive 326, when the Southbridge 318 attempts to retrieve the data from the HDD 326 along the ATA bus 352. A variation of the example shown in FIG. 7B is shown in FIG. 7C wherein the memory device 10 Or 110 is also connected to the Northbridge chip 316 through either a PCI bus, PCI express bus, or a USB bus.

Fifth, because the MCU 12 in the memory device 10 or 110 is a processor, it can be programmed to serve other functions, than the ones described heretofore. For example, the MCU 12 can be programmed such that the memory device 10 or 110 can function as an MP3 player or video play back with the songs/video stored in the NAND memories 14. The program code necessary to operate the MCU 64 of the memory controller 12 can be stored in the NOR memory 62. If the MCU 12 is not robust enough or it is desired to have dedicated hardware perform the MP3/video function, then either a dedicated DSP processor or a dedicated MP3 player processor can be integrated into the memory device 10 or 110. Thus, with this feature, whether the PC 300 is on or not, the memory device 10 or 110 can play back the songs or video stored on the NAND memories 14.

Sixth, with the memory device 10 or 110 having its MCU 12 programmed for MP3 or video playback or with the memory device 10 or 110 having a dedicated DSP processor for MP3 or video playback, even when the PC 300 is off or is in a hibernating mode, the memory device 10 or 110 can access additional audio/video data stored on the HDD 326.

In addition to the features of the above mentioned sixth mode, in the event the PC 300 has an additional display, e.g. a smaller secondary display, with the PC 300 off or in a hibernating mode, the memory device 10 or 110 can retrieve audio-visual data stored on the HDD 326 and display them on either the primary display 332 or a secondary display (not shown). Again, in this mode of operation the only "active" component of the PC 300 that requires power would be the memory device 10 or 110, the HDD 326 and the display 332 or the secondary display (not shown). Thus, with a smaller secondary display, which is "active" only when the memory device 10 or 110 is "on" when the processor 314 is in the off mode or in the hibernating mode, power savings is gained.

Finally, in a seventh mode, with the bus 350 also connected to external ports, such as USB port 327, the memory device 10 or 110, when the processor 314 is on, can act as a USB hub, or as a USB pass through device. However, when the processor 314 is off, the memory device 10 or 110 can act as the USB host, i.e. the memory device 10 or 110 controls and powers all devices connected to the USB port 327. It should be noted that the USB bus is only just one example of the type of bus to which the present invention is directed. As previously discussed, the bus 350 can be any type of bus including but not limited to PCI, PCI express, ATA etc. Among the devices that can be connected to the USB port 327 include, card reader, that provides system 300 with file image back up to the HDD 326; external USB storage device for additional storage or backup; and additional devices such as Bluetooth communication device. Thus, in this mode, it would be possible to "copy" a file from the HDD 326 without powering on the entire PC 300.

What is claimed is:

1. A controller circuit comprising:
    a first plurality of ports for connecting to a first plurality of buses for receiving and providing signals therefrom, and a second plurality of ports for connecting to a second plurality of buses for receiving and providing signals therefrom;
    a third port for connecting to a memory;
    said controller circuit operable in one of two modes: wherein in a first mode, said controller circuit functions as a pass through device to provide signals transparently to and from the plurality of first buses to the plurality of second buses; and wherein in a second mode, said controller circuit functions to monitor signals from one of the second plurality of buses to another of said second plurality of buses, in response to said signals requesting data from said controller circuit wherein said controller circuit analyzes said signals to determine if said data is in said memory.

2. A controller circuit comprising:
    a first plurality of ports for connecting to a first plurality of buses for receiving and providing signals therefrom; and a second plurality of ports for connecting to a second plurality of buses for receiving and providing signals therefrom;
    a third port for connecting to a memory;
    said controller circuit operable in one of two modes: wherein in a first mode, said controller circuit functions as a pass through device to provide signals transparently to and from the plurality of first buses to the plurality of second buses; and wherein in a second mode, said controller circuit functions to trap signals from one of the second plurality of buses and analyzes said signal to determine whether to transmit said signal to another of said second plurality of buses, in response to said signals requesting data from said controller circuit, wherein said controller circuit analyzes said signals to determine if said data is in said memory.

3. The controller circuit of claim 1 wherein said memory is a non-volatile memory.

4. The controller circuit of claim 2 wherein said memory is a non-volatile memory.

5. A memory device comprising:

a first plurality of ports for connecting to a first plurality of buses for receiving and providing signals therefrom, and a second plurality of ports for connecting to a second plurality of buses for receiving and providing signals therefrom;

said memory device operable in one of two modes: wherein in a first mode, said memory device functions as a pass through device to provide said signals transparently to and from the plurality of first buses from and to the plurality of second buses; and wherein in a second mode, said device functions to monitor said signals from one of the second plurality of buses directed to one of said first plurality of buses, wherein said signals request data from said one of said first plurality of buses, and wherein said memory device serves to respond to said signals in the event said data requested is in said memory device.

6. A memory device comprising:

a first plurality of ports for connecting to a first plurality of buses for receiving and providing signals therefrom, and a second plurality of ports for connecting to a second plurality of buses for receiving and providing signals therefrom;

said memory device operable in one of two modes: wherein in a first mode, said memory device functions as a pass through device to provide said signals transparently to and from the plurality of first buses from and to the plurality of second buses; and wherein in a second mode, said device functions to trap said signals from one of the second plurality of buses directed to one of said first plurality of buses, wherein said signals request data from said first plurality of buses, and wherein said memory device serves to re-transmit said signals after an analysis of whether said data requested is in said memory device.

* * * * *